United States Patent
Kang et al.

(10) Patent No.: US 7,907,233 B2
(45) Date of Patent: Mar. 15, 2011

(54) BACKLIGHT ASSEMBLY, LIQUID CRYSTAL DISPLAY APPARATUS HAVING THE SAME AND DEVICE FOR FORMING A PARTICLE INTERCEPTOR IN THE BACKLIGHT ASSEMBLY

(75) Inventors: Sung-Yong Kang, Suwon-si (KR); Jong-Dae Park, Seoul (KR); Yong-Gwang Won, Yongin-si (KR); Sang-Min Kang, Siheung-si (KR); Jung-Soo Ok, Yongin-si (KR); Tae-Jin Lee, Gyeonggi-do (KR)

(73) Assignee: Samsung Electronics Co., Ltd. (KR)

(*) Notice: Subject to any disclaimer, the term of this patent is extended or adjusted under 35 U.S.C. 154(b) by 0 days.

(21) Appl. No.: 12/792,321

(22) Filed: Jun. 2, 2010

(65) Prior Publication Data

US 2010/0238373 A1 Sep. 23, 2010

Related U.S. Application Data

(62) Division of application No. 10/798,814, filed on Mar. 10, 2004, now Pat. No. 7,750,992.

(30) Foreign Application Priority Data

Mar. 10, 2003 (KR) ................. 2003-14688
Mar. 11, 2003 (KR) ................. 2003-15026
Mar. 12, 2003 (KR) ................. 2003-15334

(51) Int. Cl.
*G02F 1/1333* (2006.01)
(52) U.S. Cl. .......................... 349/60; 349/58
(58) Field of Classification Search .......... 349/60, 349/58
See application file for complete search history.

(56) References Cited

U.S. PATENT DOCUMENTS

| | | | |
|---|---|---|---|
| 5,659,376 A | 8/1997 | Uehara et al. | |
| 5,808,707 A | 9/1998 | Niibori et al. | |
| 5,815,224 A | 9/1998 | Hasegawa et al. | |
| 6,147,724 A | 11/2000 | Yoshii et al. | |
| 6,292,239 B1 | 9/2001 | Nagamura et al. | |
| 6,545,733 B2* | 4/2003 | Kaga et al. | 349/58 |
| 7,184,110 B2* | 2/2007 | Kim et al. | 349/58 |
| 7,283,118 B2* | 10/2007 | Nagatani | 345/102 |
| 2002/0097353 A1 | 7/2002 | Lee | |
| 2002/0149713 A1 | 10/2002 | Ishida et al. | |

FOREIGN PATENT DOCUMENTS

JP 09022000 1/1997

OTHER PUBLICATIONS

English Translation of Chinese Office Action for Application No. 200410030298.7; Mail date Jul. 2, 2007.

* cited by examiner

*Primary Examiner* — W. Patty Chen
(74) *Attorney, Agent, or Firm* — Cantor Colburn LLP

(57) ABSTRACT

To prevent particles from infiltrating into a display apparatus, a liquid crystal display panel supporting member includes a first particle interceptor and a second interceptor. The first particle interceptor is formed along the top face of the first supporting member frame portion facing a bottom plate of a liquid crystal display panel that is to be mounted on the liquid crystal display panel supporting member. The first particle interceptor has at least two cut portions. The second particle interceptor is disposed between the cut portions to prevent particles from infiltrating into the first particle interceptor. Thus, the liquid crystal display apparatus may prevent deterioration of its display quality.

9 Claims, 16 Drawing Sheets

BACKLIGHT ASSEMBLY, LIQUID CRYSTAL DISPLAY APPARATUS HAVING THE SAME AND DEVICE FOR FORMING A PARTICLE INTERCEPTOR IN THE BACKLIGHT ASSEMBLY

CROSS-REFERENCE TO RELATED APPLICATIONS

This application is a divisional application of U.S. patent application Ser. No. 10/798,814, filed on Mar. 10, 2004, which relies for priority upon Korean Patent Application No. 2003-14688 filed on Mar. 10, 2003, Korean Patent Application No. 2003-15334 filed on Mar. 12, 2003 and Korean Patent Application No. 2003-15026 filed on Mar. 11, 2003, the contents of which are herein incorporated by reference in their entirety.

BACKGROUND OF THE INVENTION

1. Field of the Invention

The present invention relates to a backlight assembly, a liquid crystal display apparatus having the backlight assembly, and a device for forming a particle interceptor in the backlight assembly. More particularly, the present invention relates to a backlight assembly that prevents particles from infiltrating or diffusing into an image display region, a liquid crystal display apparatus having the backlight assembly, and a device for forming a particle interceptor in the backlight assembly.

2. Description of the Related Art

A liquid crystal display apparatus is a kind of a flat panel display apparatus that displays an image using liquid crystal. The liquid crystal display apparatus includes a liquid crystal control device and a light generating device. The liquid crystal control device and the light generating device are received in a receiving container.

Particles may adhere to the light generating device and/or the liquid crystal control device. The particles block passages of light to deteriorate the display quality of the liquid crystal display apparatus. To prevent generation of particles, the light generating device and the liquid crystal control device are preferably manufactured and then assembled in a clean room.

Since most liquid crystal display apparatuses are operated under conditions having many particles, the particles may infiltrate or diffuse into the light generating deice and/or the liquid crystal control device. Thus, the display quality of the liquid crystal display apparatus may be lowered.

To solve above problem, a particle interceptor has been adhered to the receiving container adjacent to the bottom plate of the light generating device. The particle interceptor includes an elastic material such as rubber, silicone, etc. The particle interceptor has a sufficient height to block inflow of the particles.

However, when the receiving container has a groove or an opening, the particle interceptor including a high reflowability material may not be coated on the groove or the opening.

SUMMARY OF THE INVENTION

Accordingly, the present invention is provided to substantially obviate one or more problems due to limitations and disadvantages of the related art.

The present invention provides a backlight assembly that prevents particles from infiltrating into an image display region of a display apparatus.

The present invention also provides a liquid crystal display apparatus having the backlight assembly.

The present invention also provides a device for forming a particle interceptor in the backlight assembly.

According to an exemplary backlight assembly of the present invention, the backlight assembly includes a receiving container, a light exiting device and a liquid crystal display panel supporting member. The receiving container includes a bottom plate and sidewalls protruded from edges of the bottom plate to form a receiving space. The light exiting device is disposed in the receiving space. The liquid crystal display panel supporting member includes a first supporting member frame portion, a second supporting member frame portion, a first particle interceptor and a second particle interceptor. The first supporting member frame portion has an opening, an opening face formed in an internal face of the first supporting member frame portion to define the opening, and a connection groove carved from the opening face. The second supporting member frame portion is vertically extended from the first supporting member frame portion. The side face of the liquid crystal display panel that is to be mounted on the liquid crystal display panel supporting member faces the inner side face of the second supporting member frame portion. The second supporting member frame portion fixes the liquid crystal display panel. The first particle interceptor is formed along the top face of the first supporting member frame portion facing to the bottom plate of the liquid crystal display panel. The first particle interceptor has at least two cut portions near the connection groove. The second particle interceptor is disposed between the cut portions to prevent particles from infiltrating into the first particle interceptor.

According to another exemplary backlight assembly of the present invention, the backlight assembly includes a receiving container, a light exiting device and a liquid crystal display panel supporting member. The receiving container includes a bottom plate and sidewalls protruded from edges of the bottom plate to form a receiving space. The light exiting device is disposed in the receiving space. The liquid crystal display panel supporting member includes a first supporting member frame portion, a second supporting member frame portion and a particle interceptor. The first supporting member frame portion has an opening formed in an internal face of the first supporting member frame portion. The second supporting member frame portion is vertically extended from the first supporting member frame portion. The side face of the liquid crystal display panel that is to be mounted on the liquid crystal display panel supporting member faces the inner side face of the second supporting member frame portion. The second supporting member frame portion fixes the liquid crystal display panel. The particle interceptor is formed in a shape of a closed loop along a first face of the first supporting member frame portion facing the bottom plate of the liquid crystal display panel. The particle interceptor prevents particles from infiltrating into the particle interceptor.

According to an exemplary liquid crystal display apparatus, the liquid crystal display apparatus includes a receiving container, a light exiting device, a liquid crystal display panel supporting member, a liquid crystal display panel assembly and a chassis. The receiving container includes a bottom plate and sidewalls protruded from edges of the bottom plate to form a receiving space. The light exiting device is disposed in the receiving space. The liquid crystal display panel supporting member includes a first supporting member frame portion, a second supporting member frame portion, a first particle interceptor and a second particle interceptor. The first supporting member frame portion has an opening, an opening face formed in an internal face of the first supporting member frame portion to define the opening, and a connection groove carved from the opening face. The second supporting member frame portion is vertically extended from the first supporting member frame portion. The side face of the liquid crystal display panel that is to be mounted on the liquid crystal display panel supporting member faces the inner side face of the second supporting member frame portion. The second supporting member frame portion fixes the liquid crystal display panel. The first particle interceptor is formed along the top face of the first supporting member frame portion facing the bottom plate of the liquid crystal display panel. The first particle interceptor has at least two cut portions near the connection groove. The second particle interceptor is disposed between the cut portions to prevent particles from infiltrating into the first particle interceptor. The liquid crystal display panel assembly is mounted on the first supporting member frame portion. The liquid crystal display panel assembly is fixed by the second supporting member frame portion. The chassis fixes the liquid crystal display panel assembly.

According to an exemplary liquid crystal display apparatus, the liquid crystal display apparatus includes a receiving container, a light exiting device, a liquid crystal display panel, a liquid crystal display panel supporting member and a chassis. The receiving container includes a bottom plate and sidewalls protruded from edges of the bottom plate to form a receiving space. The light exiting device is disposed in the receiving space to exit a light. The liquid crystal display panel converts the light into an image light. The liquid crystal display panel supporting member includes a first supporting member frame portion, a second supporting member frame portion and a particle interceptor. The first supporting member frame portion has an opening formed in an internal face of the first supporting member frame portion. The second supporting member frame portion is vertically extended from the first supporting member frame portion. The side face of the liquid crystal display panel that is to be mounted on the liquid crystal display panel supporting member faces the inner side face of the second supporting member frame portion. The second supporting member frame portion fixes the liquid crystal display panel. The particle interceptor is formed in a shape of a closed loop along a first face of the first supporting member frame portion facing the bottom plate of the liquid crystal display panel. The particle interceptor prevents particles from infiltrating into the particle interceptor. The chassis is received in the receiving container, and the chassis covers edges of a top face of the liquid crystal display panel.

According to an exemplary liquid crystal display apparatus, the liquid crystal display apparatus includes a display panel, a lamp, a receiving container and a top chassis. The display panel displays an image. The lamp provides a light to the display panel. The receiving container receives the display panel and the lamp. The top chassis is combined with the receiving container to fix the display unit in the receiving container, wherein a side face of the receiving container corresponds to a side face of the top chassis, and the receiving container has a protruding portion being laterally protruded from a bottom plate of the receiving container, wherein the side face of the top chassis is mounted on the protruding portion.

According to an exemplary device for forming a particle interceptor in a backlight assembly, the device includes a base body, a dispenser, a supply member and a transporting member. The base body supports a liquid crystal display panel supporting member including a first supporting member frame portion having an opening and supporting a liquid crystal display panel, and a second supporting member frame portion extended from the first supporting member frame portion to fix the side face of the liquid crystal display panel. The dispenser has at least one nozzle to coat a material used for forming the particle interceptor in the first supporting member frame portion. The supply member provides the material to the dispenser. The transporting member transports the dispenser to the first supporting member frame portion.

Therefore, a display quality of the liquid crystal display apparatus may not be deteriorated.

BRIEF DESCRIPTION OF THE DRAWINGS

The above and other features and advantages of the invention will become more apparent by describing exemplary embodiments thereof in detail with reference to the accompanying drawings, in which.

DESCRIPTION OF THE PREFERRED EMBODIMENTS

Hereinafter, the preferred embodiment of the invention will be described in detail with reference to the accompanying drawings.

Backlight Assembly

Figure 1:
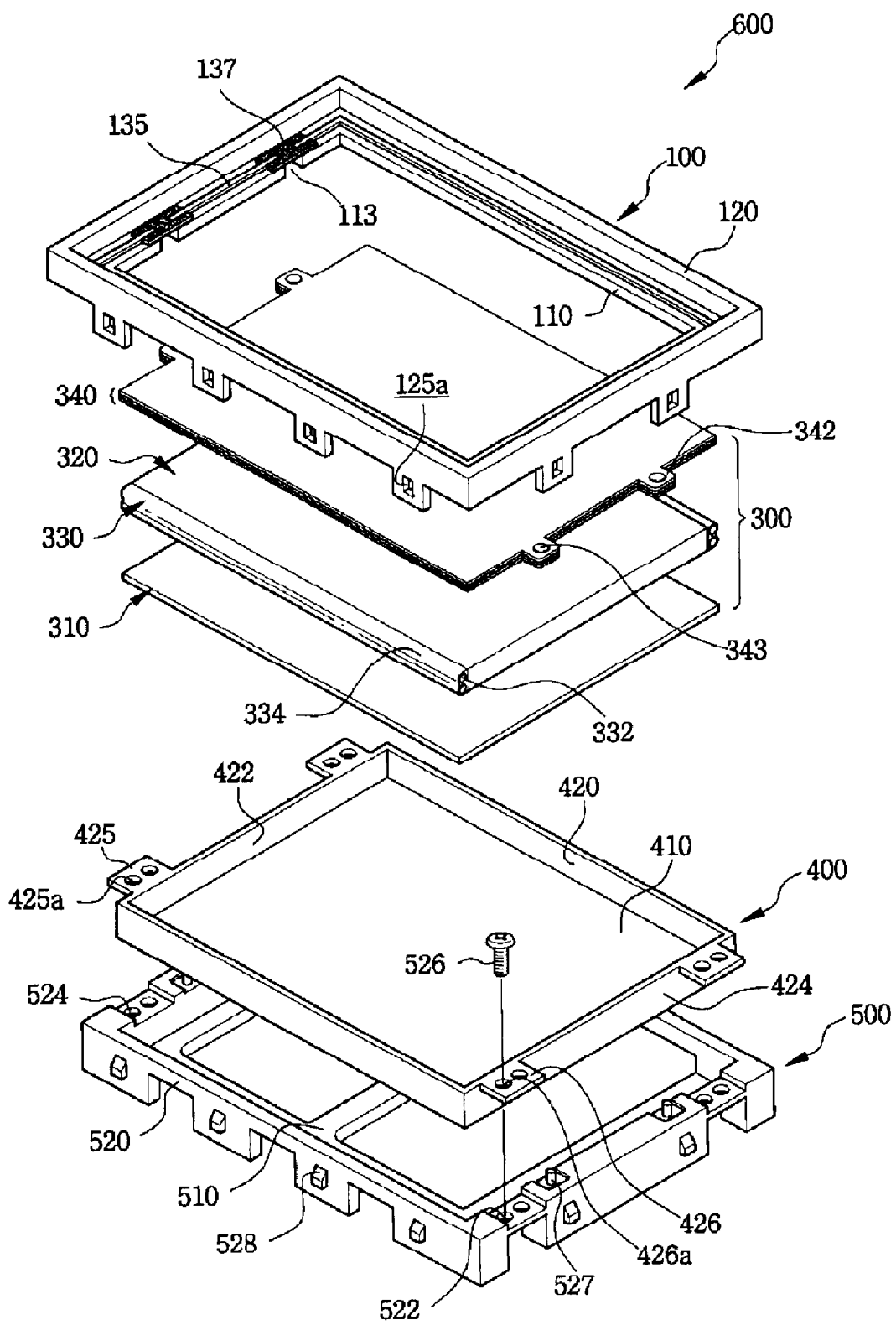
FIG. 1 is an exploded perspective view illustrating a backlight assembly according to an embodiment of the present invention.

FIG. 1 is an exploded perspective view illustrating a backlight assembly according to an embodiment of the present invention.

Referring to FIG. 1, the backlight assembly 600 includes a liquid crystal display panel supporting member 100, a first receiving container 400 and a light exiting device 300.

The liquid crystal display panel supporting member 100 has a first supporting member frame portion 110, a second supporting member frame portion 120, a first particle interceptor 135 and a second particle interceptor 137. The first supporting member frame portion 110 has a connection groove 113 and a first connection hole 125a.

The first receiving container 400 has a first bottom plate 410 and first sidewalls 420. The first receiving container 400 may include various materials. In this embodiment, the first receiving container 400 includes metal.

The first bottom plate 410 has a rectangular plate shape. Each of the first sidewalls 420 is protruded from each edge of the first bottom plate 410 to form a receiving space. Portions 422 and 424 of the first sidewalls 420 are extended upwardly from edges of the first bottom plate 410, and the portions 422 and 424 include brackets 425 and 426, respectively. The first receiving container 400 is fixed to a second receiving container 500 by the brackets 425 and 426. The brackets 425 and 426 have first screw connection holes 425a and 426a formed therein.

The light exiting device 300 is disposed in the receiving space of the first receiving container 400. The light exiting device 300 includes a reflection plate 310, a light guide plate 320, a lamp assembly 330 and optical sheets 340.

The reflection plate 310 is disposed on the bottom plate 410 of the first receiving container 400. For example, the reflection plate 310 includes a synthetic resin having high reflectivity. The light guide plate 320 is disposed on the reflection plate 310. For example, the light guide plate 320 has a shape of rectangular plate of which thickness is uniform or decreases.

The lamp assembly 330 may be disposed on both sides of the light guide plate 320. The lamp assembly 330 includes a lamp 332 and a lamp cover 334.

The lamp 332 is disposed adjacent to the side face of the light guide plate 320. A cold cathode fluorescent lamp may be used as the lamp 332. The lamp cover 334 covers the lamp 332 to dispose the lamp 332 at the side face of the light guide plate 320.

The optical sheets 340 are disposed on the light guide plate 320. The optical sheets 340 enhance uniformity of the brightness of the light exiting from the light guide plate 320. The optical sheets 340 also improve the uniformity of brightness distribution of the light. The optical sheets 340 include one or more diffusion sheets and one or more prism sheets. The optical sheets 340 have at least one protruded fixing portion 342. A second connection hole 343 is formed in the fixing portion 342.

The second receiving container 500 is manufactured to have a shape suitable to receive the first receiving container 400. The second receiving container 500 has a shape of rectangular parallelepiped box with a top face open.

The second receiving container 500 has a second bottom plate 510 and second sidewalls 520. Portions of the second sidewalls 520 corresponding to the first screw connection holes 425a and 426b in the brackets 425 and 426 of the first receiving container 400 have second screw connection holes 522 and 524. Screws 526 combine the first receiving container 400 with the second receiving container 500 through the first screw connection holes 425a and 426a and the second connection holes 522 and 524.

The second receiving container 500 has a fixing boss 527 formed on the top face of the sidewalls 520 thereof. The fixing boss 527 is combined with the second connection hole 343 formed in the fixing portion 342 of the optical sheets 340.

A connection protrusion 528 formed on the side face of the second sidewalls 520 is hooked to the first connection hole 125a to combine the second receiving container 500 with the liquid crystal display panel supporting member 100.

Figure 2:
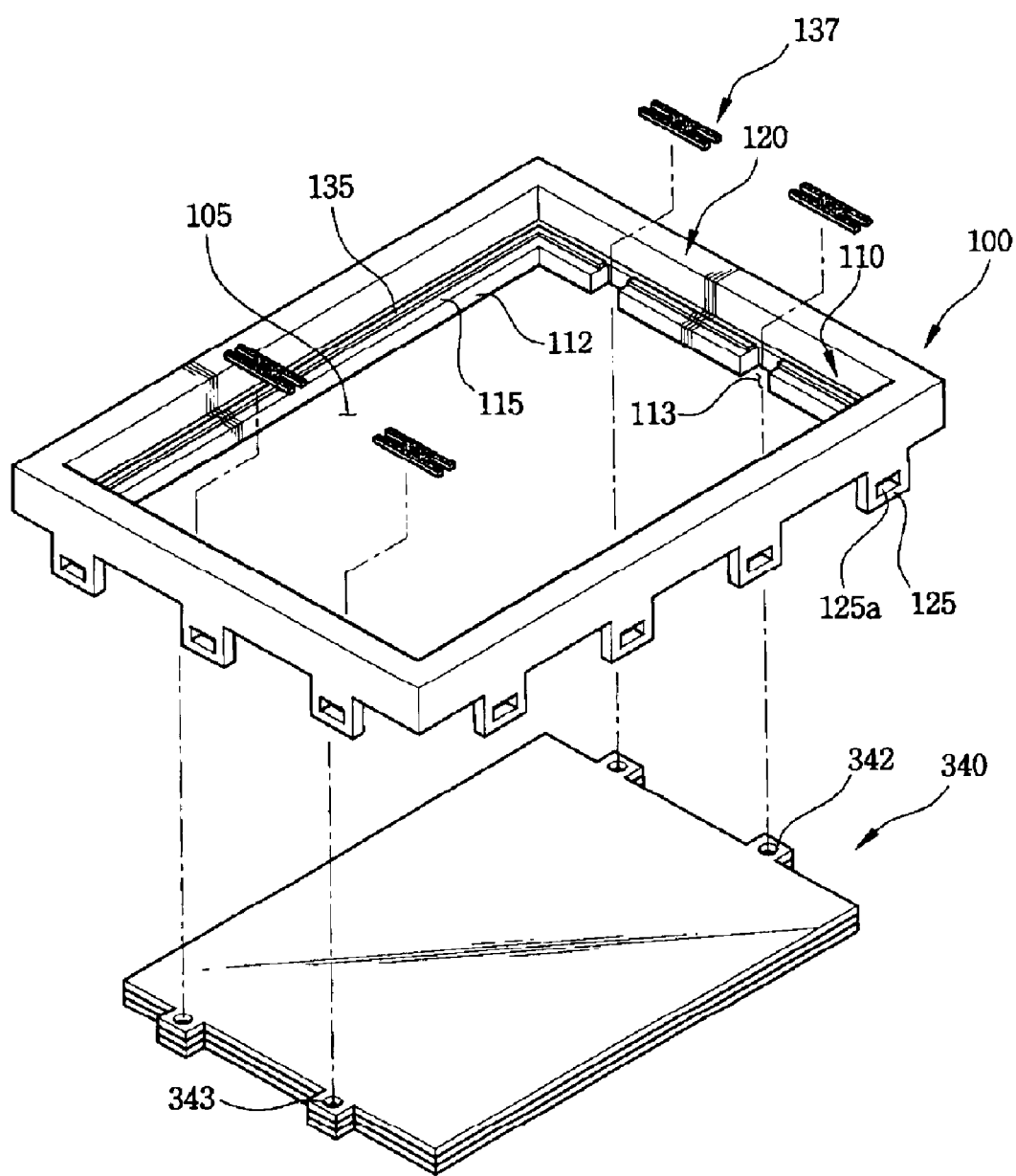
FIG. 2 is a partially exploded perspective view illustrating the liquid crystal display panel supporting member and the optical sheets shown in FIG. 1.
Figure 3:
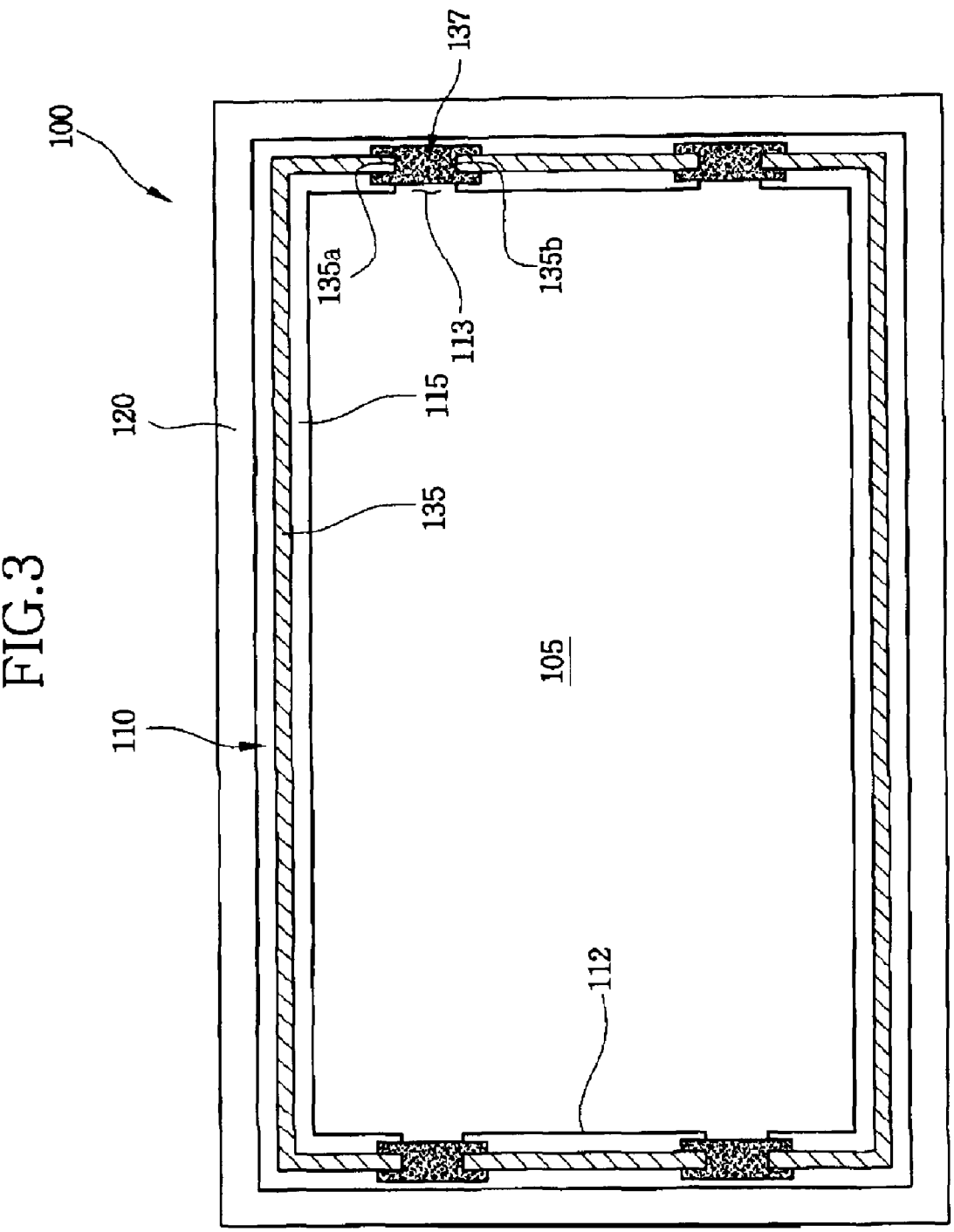
FIG. 3 is a plan view illustrating the liquid crystal display panel supporting member in FIG. 1.

FIG. 2 is a partially exploded perspective view illustrating the liquid crystal display panel supporting member and the optical sheets shown in FIG. 1. FIG. 3 is a plan view illustrating the liquid crystal display panel supporting member in FIG. 1.

The liquid crystal display panel supporting member 100 receives a liquid crystal display panel (not shown) to fix the liquid crystal display panel. To prevent moving of the liquid crystal display panel, the liquid crystal display panel supporting member 100 has a shape corresponding to that of the liquid crystal display panel.

In this embodiment, the liquid crystal display panel has a shape of rectangular plate. Thus, the liquid crystal display panel supporting member 100 has a rectangular frame shape having an opening to supporting member the liquid crystal display panel.

The first supporting member frame portion 110 supports the bottom plate of the liquid crystal display panel. The first supporting member frame portion 110 has a shape of rectangular frame with an opening 105. The edges of the bottom plate of the liquid crystal display panel are in contact with the first supporting member frame portion 110. A light is provided to the liquid crystal display panel through the opening 105 of the first supporting member frame portion 110.

The first supporting member frame portion 110 has an opening face 112 in an internal face thereof to define the area and the shape of the opening 105. The first supporting member frame portion 110 has the connection groove 113 carved from the opening face 112. At least one connection groove 113 may be formed in the first supporting member frame portion 110. In this embodiment, two connection grooves 113 are respectively formed on two opposite faces of the opening faces 112.

The optical sheets 340 are combined with the connection groove 113. The optical sheets 340 generally changes the optical characteristic of the light provided to the liquid crystal display panel. The protruded fixing portion 342 of the optical sheets 340 is combined with the connection groove 113.

The second supporting member frame portion 120 is vertically extended from the first supporting member frame portion 110. The side face of the liquid crystal display panel faces the inner side face of the second supporting member frame portion 120. The second supporting member frame portion 120 fixes the liquid crystal display panel. The first and second supporting member frame portions 110 and 120 are integrally formed by injection molding method. Alternatively, the first supporting member frame portion 110 may be attached to the second supporting member frame portion 120.

The first supporting member frame 120 has a connection member 125 to connect the second supporting member frame portion 120 to another member such as a receiving container. The connection member 125 is protruded from the first supporting member frame portion 110 in a reverse direction to the extension direction of the second supporting member frame portion 120. The connection member 125 has the first connection hole 125a.

The first particle interceptor 135 prevents particles from passing through the space between the first supporting member frame portion 110 and the bottom plate of the liquid crystal display panel.

Referring again to FIG. 2, the first particle interceptor 135 is formed along the top face 115 of the first supporting member frame portion 110 facing the bottom plate of the liquid crystal display panel.

The first particle interceptor 135 is preferably formed in a shape of closed loop. In practice, since connection groove 113 is formed in the path where the first particle interceptor 135 is to be formed, forming the first particle interceptor in a closed loop becomes very hard.

The first particle interceptor 135 is not disposed in the connection groove 113, thus particles may infiltrate into this portion. When the first particle interceptor 135 includes rubber or silicone having high flowability, the materials in the first particle interceptor 135 may flow into and contaminate the connection groove 113.

Since the first supporting member frame portion 110 has at least one connection groove 113, the first particle interceptor 135 has at least two cut portions 135a and 135b near the connection groove 113 (see FIG. 3).

The first particle interceptor 135 may not possibly have a shape of closed loop because of the cut portions 135a and 135b. Display quality of the display apparatus may be deteriorated due to particles infiltrated into the end portions 135 and 135b of the first particle interceptor 135. To solve this, the second particle interceptor 137 is disposed on the first supporting member frame portion 110.

Figure 4:
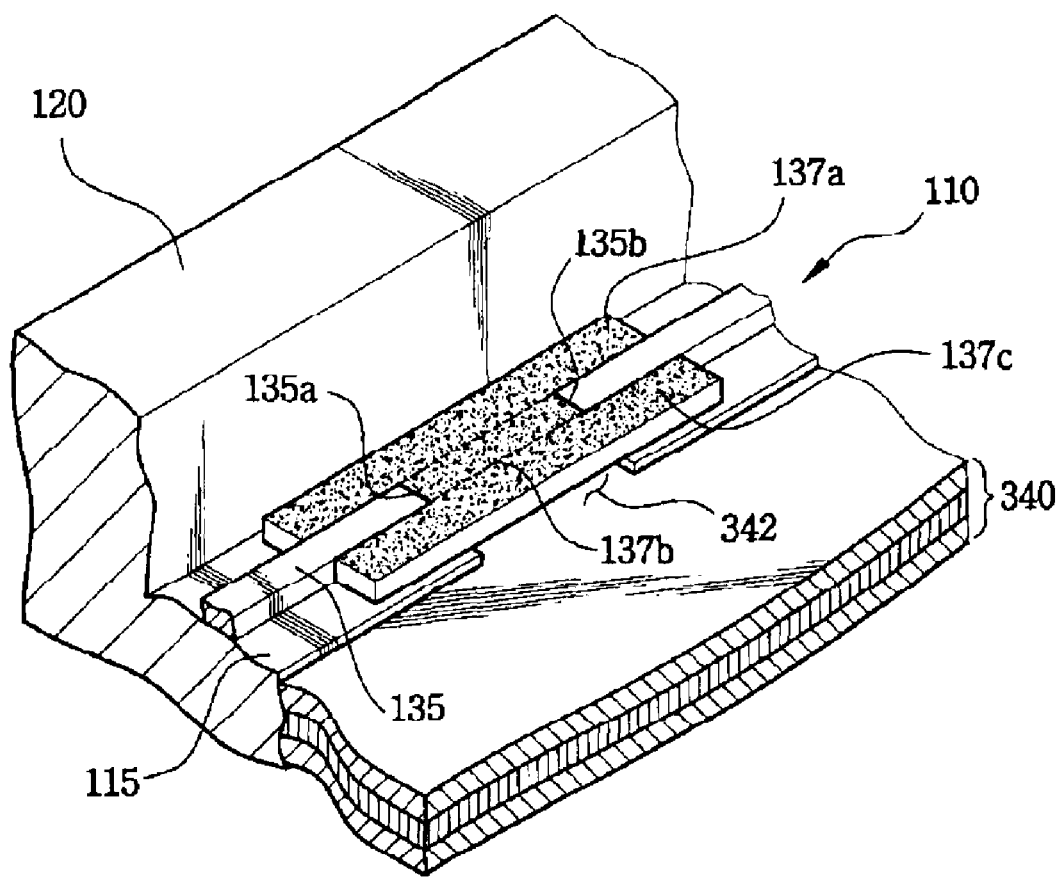
FIG. 4 is a partially cut perspective view enlarging the second particle interceptor portion in FIG. 1.

FIG. 4 is a partially cut perspective view enlarging the second particle interceptor portion of FIG. 1.

Referring to FIGS. 3 and 4, the second particle interceptor 137 is formed to prevent the particles from infiltrating into the cut portions 135a and 135b of the first particle interceptor 135.

For example, the second particle interceptor 137 includes polyethyleneterephthalate (PET). The second particle interceptor 137 may include other synthetic resins.

The second particle interceptor 137 has a first body 137a, a second body 137b and a third body 137c. Each of the first and third bodies 137a and 137c has a rectangular parallelepiped rod shape. The first and third bodies 137a and 137c stick to the side face of the first particle interceptor 135, respectively. The first and third bodies 137a and 137c are disposed adjacent to the cut portions 135a and 135b of the first particle interceptor 135. Preferably, the first body 137a and the third body 137c are substantially parallel to each other. The cut portions 135a and 135b of the first particle interceptor 135 are disposed between the first body 137a and the third body 137c. For example, the second particle interceptor 137 has a shape of an alphabet 'H'.

When the first body 137a and the third body 137c are individually formed, the first and third body 137a and 137c are attached to the first supporting member frame portion 110 by a separate process. Hence, required manufacturing processes are increased and processing time thereof is also increased.

To simplify the manufacturing process and reduce processing time thereof, the first body 137a is combined with the third body 137c by the second body 137b. The second body 137b is interposed between the cut portions 135a and 135b of the first particle interceptor 135 to combine the first body 137a with the third body 137c. Although the first to third bodies 137a, 137b and 137c are separated by a dotted line in FIG. 4, the dotted line is solely given for the illustration of structures of the second particle interceptor 137. In practice, the first to third bodies 137a, 137b and 137c are integrally formed.

The face of the second particle interceptor 137 facing the first supporting member frame portion 110 may be coated with an adhesive material. The second particle interceptor 137 adheres to the first supporting member frame portion 110 by the adhesive material.

The second particle interceptor 137 according to the present invention prevents particles from infiltrating into an image display region through the cut portions 135a and 135b of the first particle interceptor 135.

Figure 5:
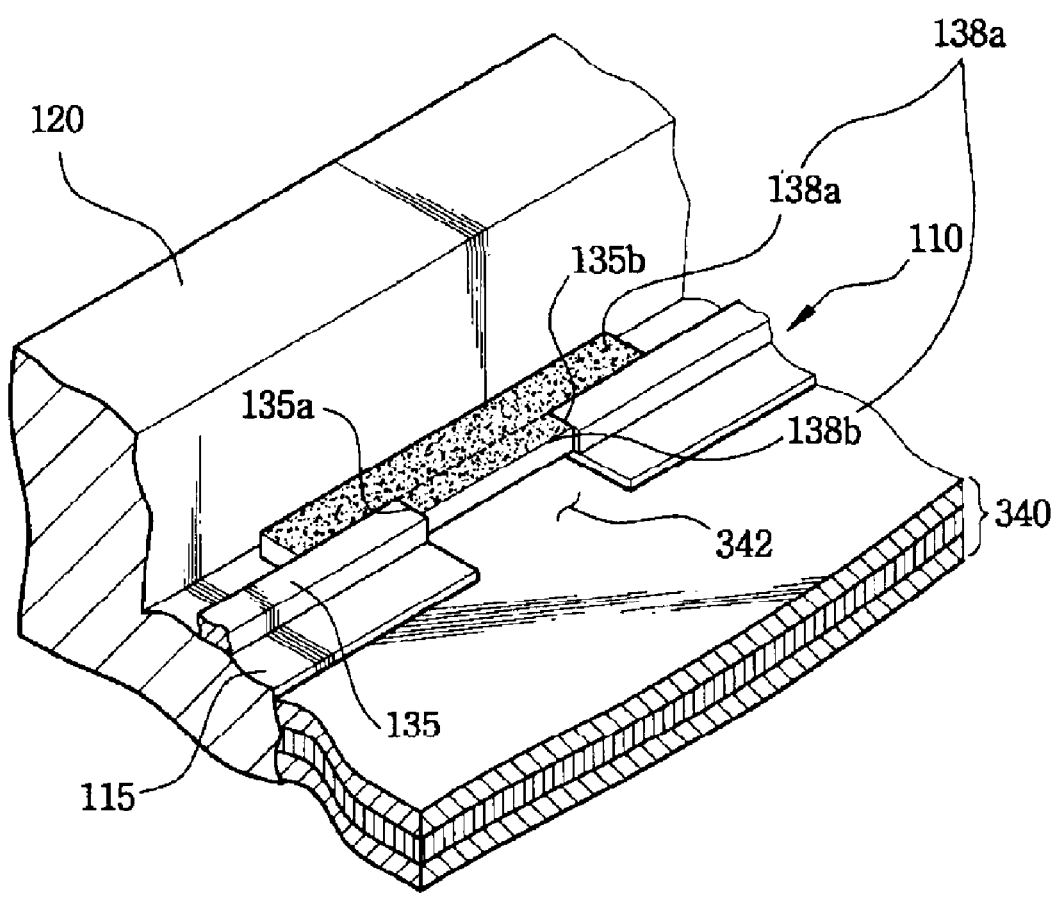
FIG. 5 is a partially cut enlarged and perspective view illustrating a second particle interceptor portion in a backlight assembly according to another embodiment of the present invention.

FIG. 5 is a partially cut enlarged and perspective view illustrating a second particle interceptor portion in a backlight assembly according to another embodiment of the present invention. In this embodiment, the backlight assembly has a structure substantially identical with that of the above described backlight assembly except for the second particle interceptor. Thus, the same reference numerals will be used for identical elements and any further explanation will be omitted.

Referring to FIG. 5, the second particle interceptor 138 includes a first body 138a and a second body 138b. The first body 138a has a rectangular parallelepiped rod shape. The first body 138a is disposed adjacent to the cut portions 135a and 135b of the first particle interceptor 135. Preferably, the first body 138a is substantially parallel to the first particle interceptor 135. The side face of the first particle interceptor 135 sticks to the side face of the first body 138a of the second particle interceptor 138 to prevent the particles from infiltrating into the space between the first particle interceptor 135 and the second particle interceptor 138.

The second body 138b is connected to the first body 138a to effectively block infiltration of particles. The second body 138b is interposed between the cut portions 135a and 135b of the first particle interceptor 135 to prevent the particles from infiltrating into the space between the cut portions 135a and 135b of the first particle interceptor 135. For example, the second particle interceptor 137 has a shape of character 'T'. Although the first and second bodies 138a and 138b are separated by a dotted line (or virtual line) in FIG. 5, the dotted line is solely given for the illustration of structures of the second particle interceptor 138. In practice, the first and second bodies 138a and 138b are integrally formed.

The face of the second particle interceptor 138 facing to the first supporting member frame portion 110 may be coated with an adhesive material. The second particle interceptor 138 adheres to the first supporting member frame portion 110 by the adhesive material.

Figure 6:
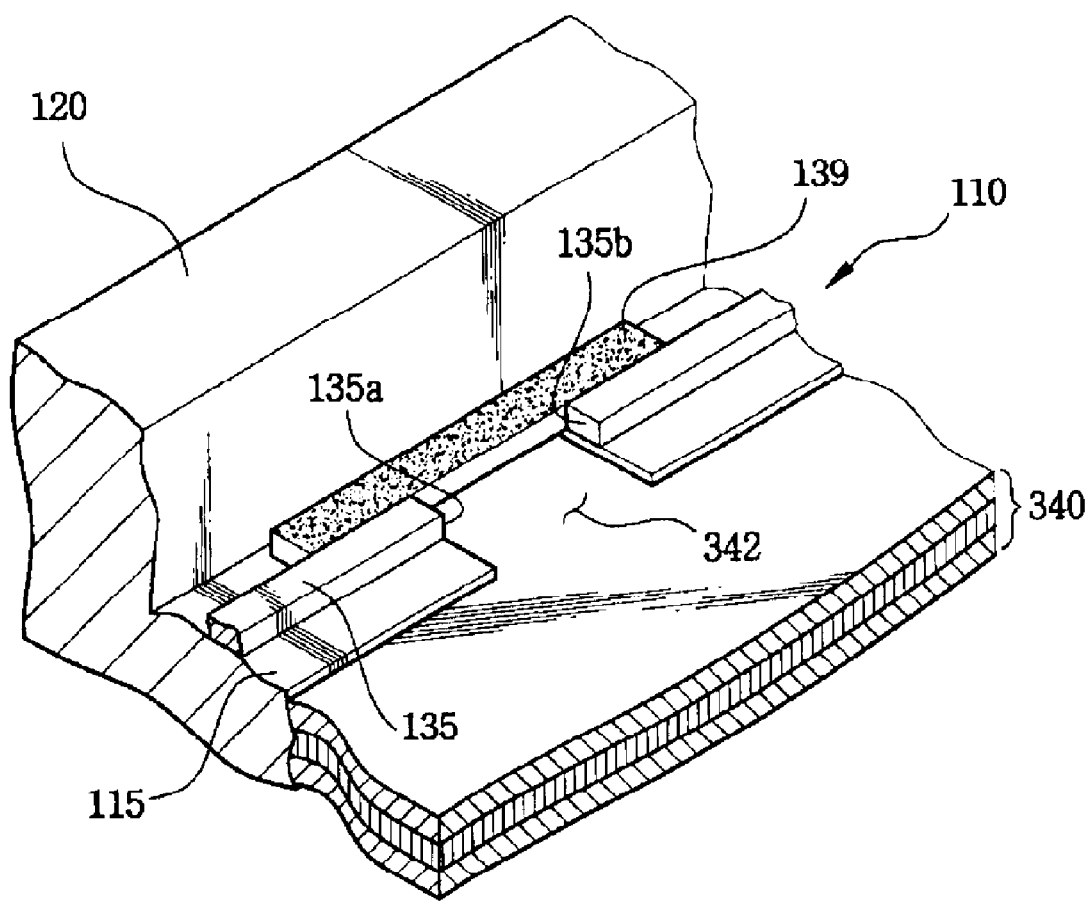
FIG. 6 is a partially cut enlarged and perspective view illustrating a second particle interceptor portion in a backlight assembly according to still another embodiment of the present invention.

FIG. 6 is a partially cut enlarged and perspective view illustrating a second particle interceptor portion in a backlight assembly according to still another embodiment of the present invention. In this embodiment, the backlight assembly has a structure substantially identical with that of the above described backlight assembly except for the second particle interceptor. Thus, the same reference numerals will be used for identical elements and any further explanation will be omitted.

Referring to FIG. 6, the second particle interceptor 139 has a rectangular parallelepiped rod shape. The second particle interceptor 139 is disposed adjacent to the cut portions 135a and 135b of the first particle interceptor 135. The second particle interceptor 139 has a shape of band. Preferably, the second particle interceptor 139 is substantially parallel to the first particle interceptor 135. The side face of the first particle interceptor 135 sticks to the side face of the second particle interceptor 139 to prevent the particles from infiltrating into the space between the first particle interceptor 135 and the second particle interceptor 139.

The face of the second particle interceptor 139 facing the first supporting member frame portion 110 may be coated with an adhesive material. The second particle interceptor 139 adheres to the first supporting member frame portion 110 by the adhesive material.

Figure 7:
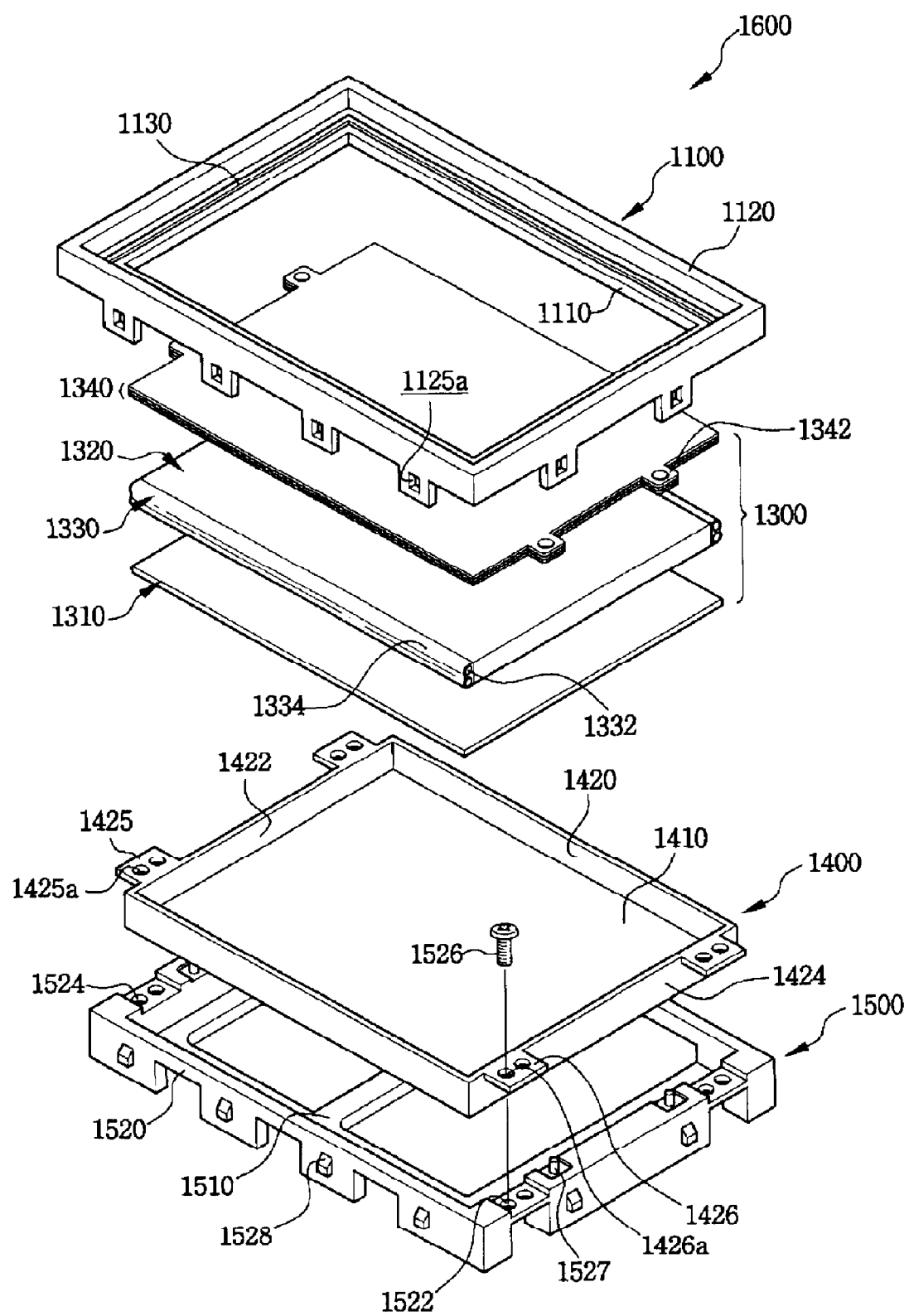
FIG. 7 is an exploded perspective view illustrating a backlight assembly according to still another embodiment of the present invention.
Figure 8:
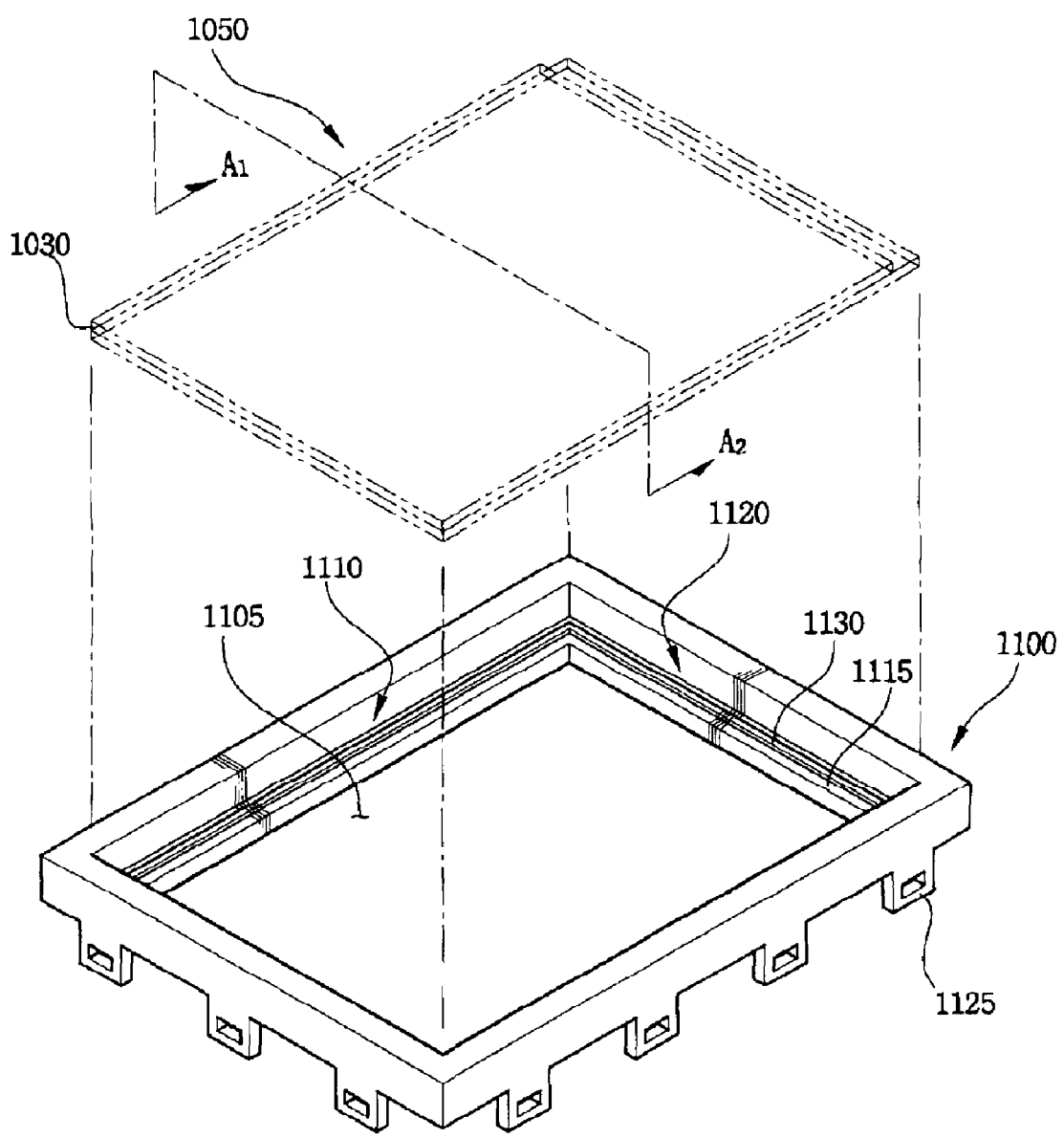
FIG. 8 is a perspective view illustrating a virtual liquid crystal display panel, the liquid crystal display panel supporting member and the optical sheets shown in FIG. 7.
Figure 9:
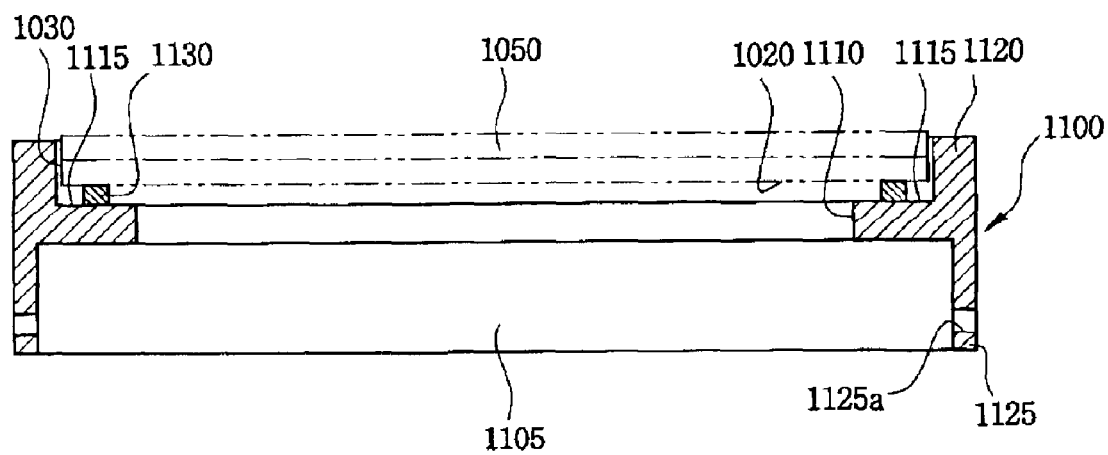
FIG. 9 is a cross-sectional view taken along a line $A_1$-$A_2$ in FIG. 7.

FIG. 7 is an exploded perspective view illustrating a backlight assembly according to still another embodiment of the present invention. FIG. 8 is a perspective view illustrating a virtual liquid crystal display panel, the liquid crystal display panel supporting member and the optical sheets shown in FIG. 7. FIG. 9 is a cross-sectional view taken along a line $A_1$-$A_2$ in FIG. 7.

Referring to FIG. 7, the backlight assembly 1600 includes a liquid crystal display panel supporting member 1100, a first receiving container 1400 and a lightexiting device 1300.

The liquid crystal display panel supporting member 1100 has a first supporting member frame portion 1110 and a second supporting member frame portion 1120. The first supporting member frame portion 1110 has a first connection hole 1125a.

The first receiving container 1400 has a first bottom plate 1410 and first sidewalls 1420. The first receiving container 1400 may include various materials. In this embodiment, the first receiving container 1400 includes metal.

The first bottom plate 1410 has a shape of rectangular plate. Each of the first sidewalls 1420 is protruded from each edge of the first bottom plate 1410 to form a receiving space. Portions 1422 and 1424 of the first sidewalls 1420 are extended from an edge of the first bottom plate 1410 in a substantially perpendicular direction, and the portions 1422 and 1424 include brackets 1425 and 1426, respectively. The first receiving container 1400 is fixed to a second receiving container 1500 by the brackets 1425 and 1426. The brackets 1425 and 1426 have first screw connection holes 1425a and 1426a formed therein.

The light exiting device 1300 is disposed in the receiving space of the first receiving container 1400. The light exiting device 1300 includes a reflection plate 1310, a light guide plate 1320, a lamp assembly 1330 and optical sheets 1340.

The reflection plate 1310 is disposed on the bottom plate 1410 of the first receiving container 1400. The reflection plate 1310, for example, includes a synthetic resin having high reflectivity. The light guide plate 1320 is disposed on the reflection plate 1310. The light guide plate 1320 has a shape of rectangular plate of which thickness is uniform or decreases.

The lamp assembly 1330 may be disposed on both sides of the light guide plate 1320. The lamp assembly 1330 includes a lamp 1332 and a lamp cover 1334.

The lamp 1332 is disposed adjacent to the side face of the light guide plate 1320. A cold cathode fluorescent lamp may be used as the lamp 1332. The lamp cover 1334 covers the lamp 1332 to combine the lamp 1332 with the side face of the light guide plate 1320.

The optical sheets 1340 are disposed on the light guide plate 1320. The optical sheets 1340 enhance uniformity of the brightness of the light exited from the light guide plate 1320. The optical sheets 1340 also improve the uniformity of brightness distribution of the light. The optical sheets 1340 include one or more diffusion sheets and one or more prism sheets. The optical sheets 1340 have at least one protruded fixing portion 1342. A second connection hole 1343 is formed in the fixing portion 1342.

The second receiving container 1500 is manufactured to have a shape suitable to receive the first receiving container 1400. The second receiving container 1500 has a shape of rectangular parallelepiped box with a top face open.

The second receiving container 1500 has a second bottom plate 1510 and second sidewalls 1520. Portions of the second sidewalls 1520 corresponding to the first screw connection holes 1425a and 1426b in the brackets 1425 and 1426 of the first receiving container 1400 have second screw connection holes 1522 and 1524. Screws 1526 combine the first receiving container 1400 with the second receiving container 1500 through the first screw connection holes 1425a and 1426a and the second connection holes 1522 and 1524.

The second receiving container 1500 has a fixing boss 1527 formed on the top face of the sidewalls 1520 thereof. The fixing boss 1527 is combined with the second connection hole 1343 formed in the fixing portion 1342 of the optical sheets 1340.

A connection protrusion 1528 formed on the side face of the second sidewalls 1520 is hooked to the first connection hole 1125a to combine the second receiving container 1500 with the liquid crystal display panel supporting member 1100.

Referring to FIGS. 7 to 9, the liquid crystal display panel supporting member 1100 fixes the virtual liquid crystal display panel 1050 shown in FIG. 8. Thus, the liquid crystal display panel supporting member 1100 has a shape corresponding to the liquid crystal display panel 1050. In this embodiment, the liquid crystal display panel 1050 has a rectangular plate shape, and the liquid crystal display panel supporting member 1100 has a rectangular frame with an opening to support the liquid crystal display panel 1050.

The liquid crystal display panel supporting member 1100 has the first supporting member frame portion 1110, the second supporting member frame portion 1120 and a particle interceptor 1130.

Referring to FIGS. 8 and 9, the first supporting member frame portion 1110 supports the bottom plate 1020 of the liquid crystal display panel 1050. The edges of the bottom plate 1020 of the liquid crystal display panel 1050 are in contact with the first supporting member frame portion 1110. Since the bottom plate 1020 of the liquid crystal display panel 1050 has a rectangular shape, the first supporting member frame portion 1100 has a rectangular frame shape.

The second supporting member frame portion 1120 is vertically extended from the first supporting member frame portion 1110. The side face of the liquid crystal display panel 1050 faces the inner side face of the second supporting member frame portion 1120. The second supporting member frame portion 1120 fixes the liquid crystal display panel 1050. The first and second supporting member frame portions 1110 and 1120 are integrally formed by injection molding method. Alternatively, the first supporting member frame portion 1110 may be attached to the second supporting member frame portion 1120.

The first supporting member frame 1120 has a connection member 1125 to connect the second supporting member frame portion 1120 to another member such as a receiving container. The connection member 1125 is protruded from the first supporting member frame portion 1110 in a reverse direction to the extension direction of the second supporting member frame portion 1120. The connection member 1125 has the first connection hole 1125a.

The particle interceptor 1130 prevents particles from passing through the space between the first supporting member frame portion 1110 and the bottom plate of the liquid crystal display panel 1050.

Referring again to FIGS. 7 to 9, the particle interceptor 1130 corresponds to a particle intercepting protrusion coated on the first supporting member frame portion 1110. In this embodiment, same reference numeral will be used for the particle interceptor and the particle intercepting protrusion.

The particle intercepting protrusion 1130 is formed on the first supporting member frame portion 1110 in a closed loop shape. In particular, a material containing an adhesive material is coated on the first supporting member frame portion 1110 to have a predetermined height. The material is then solidified to form the particle intercepting protrusion 1130.

The material that is used for forming the particle intercepting protrusion 1130 includes a material having an elastic force such as silicone or rubber. The material may stick to the liquid crystal display panel 1050 without damaging the liquid crystal display panel 1050. In this embodiment, a silicone material will be described as an example.

The particle intercepting protrusion 1130 sticks to the bottom plate 1020 of the liquid crystal display panel 1050 in a shape of closed loop. Thus, particles may not infiltrate into the space between the first supporting member frame portion 1110 and the bottom plate 1020 of the liquid crystal display panel 1050.

Particularly, the liquid crystal display panel 1020 is mounted on the fist supporting member frame portion 1110 after the particle intercepting protrusion 1130 is formed as a closed loop shape in the first supporting member frame portion 1110. Thus, infiltrating of particles may be prevented.

As described above, the particle intercepting protrusion having a shape of closed loop blocks infiltration of particles. Thus, deterioration of display quality of a display apparatus may be reduced.

Figure 10:
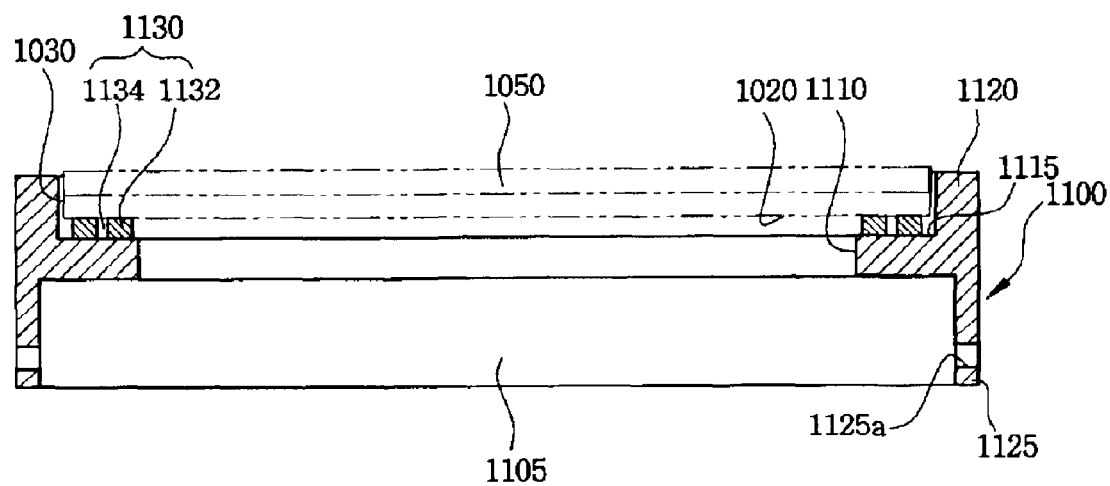
FIG. 10 is a cross-sectional view illustrating the liquid crystal display panel supporting member of a backlight assembly according to sill another embodiment of the present invention.

FIG. 10 is a cross-sectional view illustrating the liquid crystal display panel supporting member of a backlight assembly according to sill another embodiment of the present invention. In this embodiment, the backlight assembly has a structure substantially identical with that of the above described backlight assembly except for the particle interceptor. Thus, the same reference numerals will be used for identical elements and any further explanation will be omitted.

Referring to FIG. 10, the particle interceptor 1130 has particle intercepting protrusions 1132 and particle intercepting recesses 1134.

The particle intercepting protrusions 1132 are formed on the first face 1115 of the first supporting member frame portion 1110 in at least two rows. The two rows of the particle intercepting protrusions 1132 are spaced apart from each other. Each of the particle intercepting protrusions 1132 includes silicone. The particle intercepting protrusion 1132 is formed in a shape of closed loop.

The space between a plurality of particle intercepting protrusions 1132 gives the particle intercepting recess 1134. The number of particle intercepting protrusions 1132 determines the number of particle intercepting recesses 1134.

When the liquid crystal display panel 1050 sticks to the particle intercepting protrusion 1132, particles may not infiltrate into the space between the bottom plate 1020 of the liquid crystal display panel 1050 and the particle intercepting protrusion 1132 due to the height of the particle intercepting protrusion 1132. Further, the particle intercepting recess 1134 collects some particles still infiltrated through the particle intercepting protrusion 1132 by gravity.

As described above, the particle intercepting protrusions are formed on the first supporting member frame portion in at least two rows in closed loop. The particle intercepting protrusions prevent particles from jumping over the particle intercepting protrusions. Further, the recess between adjacent particle intercepting protrusions collects the particles infiltrating the particle intercepting protrusion to maintain the display quality of a display apparatus.

Figure 11:
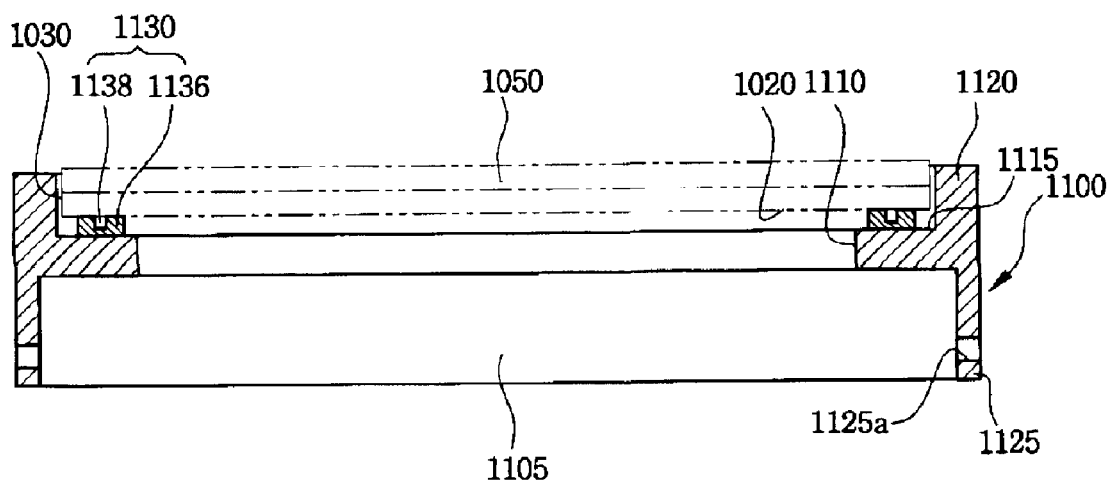
FIG. 11 is a cross-sectional view illustrating the liquid crystal display panel supporting member of a backlight assembly according to still another embodiment of the present invention.

FIG. 11 is a cross-sectional view illustrating the liquid crystal display panel supporting member of a backlight assembly according to still another embodiment of the present invention. In this embodiment, the backlight assembly has a structure substantially identical with that of the above described backlight assembly except for the second particle interceptor. Thus, the same reference numerals will be used for identical elements and any further explanation will be omitted.

Referring to FIG. 11, a first supporting member frame 1110 has a first particle interceptor 1130. The particle interceptor 1130 includes a particle intercepting protruding portions 1136 and a particle intercepting recess 1138.

To form the particle interceptor 1130, the first face 1115 of the first supporting member frame portion 1110 is coated with a material containing silicone, such that the particle interceptor 1130 has a predetermined width. The coated silicone material is then compressed along the first face 1115.

During the compression process, the compression force applied to the silicone material may not be homogeneous. A greater force, for example, is applied to the central portion of the silicone material than the other portions.

Accordingly, the portion compressed by a greater force than the other portions becomes the particle intercepting recess 1138, and the other portions become the particle intercepting protruding portions 1136.

The number of particle intercepting protruding portions 1136 determines the number of particle intercepting recess 1138. The particle intercepting protruding portions 1136 and the particle intercepting recess 1138 have a shape of closed loop respectively.

When the liquid crystal display panel 1050 sticks to the particle intercepting protruding portions 1136, particles may not infiltrate into the space between the bottom plate 1020 of the liquid crystal display panel 1050 and the particle intercepting protruding portions 1136 due to the height of the particle intercepting protruding portions 1136. The particle interceptor recess 1138 collects some particles infiltrated through the particle intercepting protruding portions 1136 by gravity.

As described above, particles may be collected at least twice by the particle intercepting protruding portions and the particle intercepting recess. The display quality of the display apparatus may not be deteriorated. Further, at least two particle intercepting protruding portions and the particle interceptor recess are formed by a single process. Thus, manufacturing process and processing time thereof may be decreased.

Liquid Crystal Display Apparatus

Figure 12:
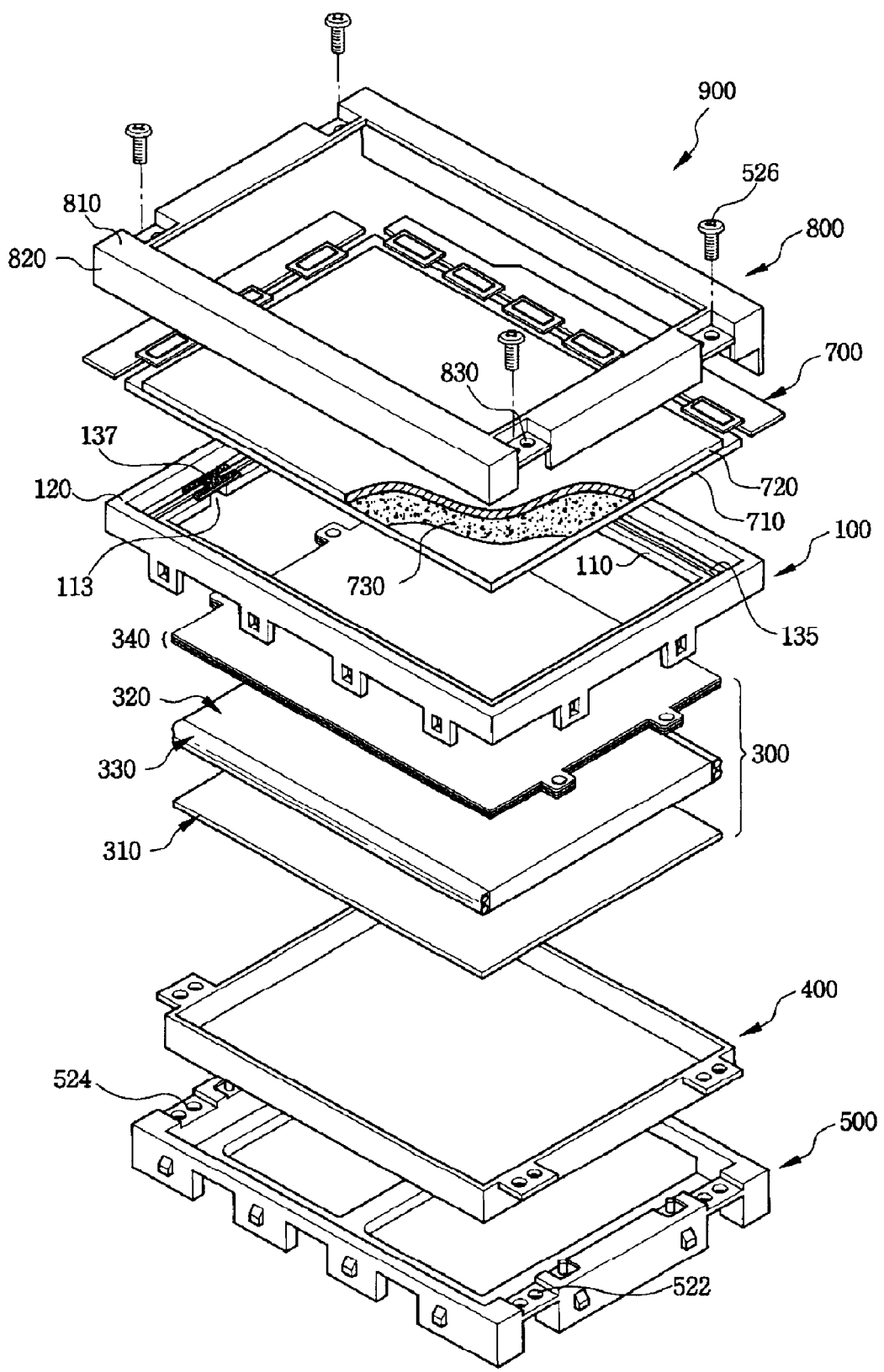
FIG. 12 is an exploded perspective view illustrating a liquid crystal display apparatus according to an embodiment of the present invention.

FIG. 12 is an exploded perspective view illustrating a liquid crystal display apparatus according to an embodiment of the present invention.

Referring to FIG. 12, the liquid crystal display apparatus 900 includes a first receiving container 400, a light exiting device 300, a liquid crystal display panel 700, a liquid crystal display panel supporting member 100, a second receiving container 500 and a chassis 800.

The first receiving container 400, the light exiting device 300 and the liquid crystal display panel supporting member 100 have been described above with reference to foregoing embodiments, and are therefore not described in further detail here.

The liquid crystal display panel 700 is disposed in the first supporting member frame portion 110 of the liquid crystal display panel supporting member 100. Additionally, the liquid crystal display panel 700 is fixed by the second frame portion 120 of the liquid crystal display panel supporting member 100.

The liquid crystal display panel 700 includes a thin film transistor (TFT) substrate 710, a liquid crystal layer 730 and a color filter substrate 720. The TFT substrate 710 corresponds to the color filter substrate 720. The liquid crystal layer 730 is interposed between the TFT substrate 710 and the color filter substrate 720.

The chassis 800 fixes the liquid crystal display panel 700, and protects the liquid crystal display panel 700 from external impact.

The chassis 800 includes a first chassis face 810 and a second chassis face 820 extended from the first chassis face 810.

The first chassis face 810 has a shape of rectangular plate to cover the edges of the color filter substrate 720. The second chassis face 820 is extended from the first chassis face 810 in a direction substantially parallel to the fist sidewalls 420 of the first receiving container 400. The second chassis 820 has a shape to cover the first sidewalls 420 of the first receiving container 400.

The chassis 800 has third screw connection holes 830. The third screw connection holes 830 are formed in a position of the chassis 800 corresponding to the second screw connection holes 522 and 524 of the second receiving container 500. The screws 526 combine the chassis 800 with the second receiving container 500 through the first screw connection holes 425a and 426a, the second screw connection holes 522 and 524, and the third screw connection holes 830.

Figure 13:
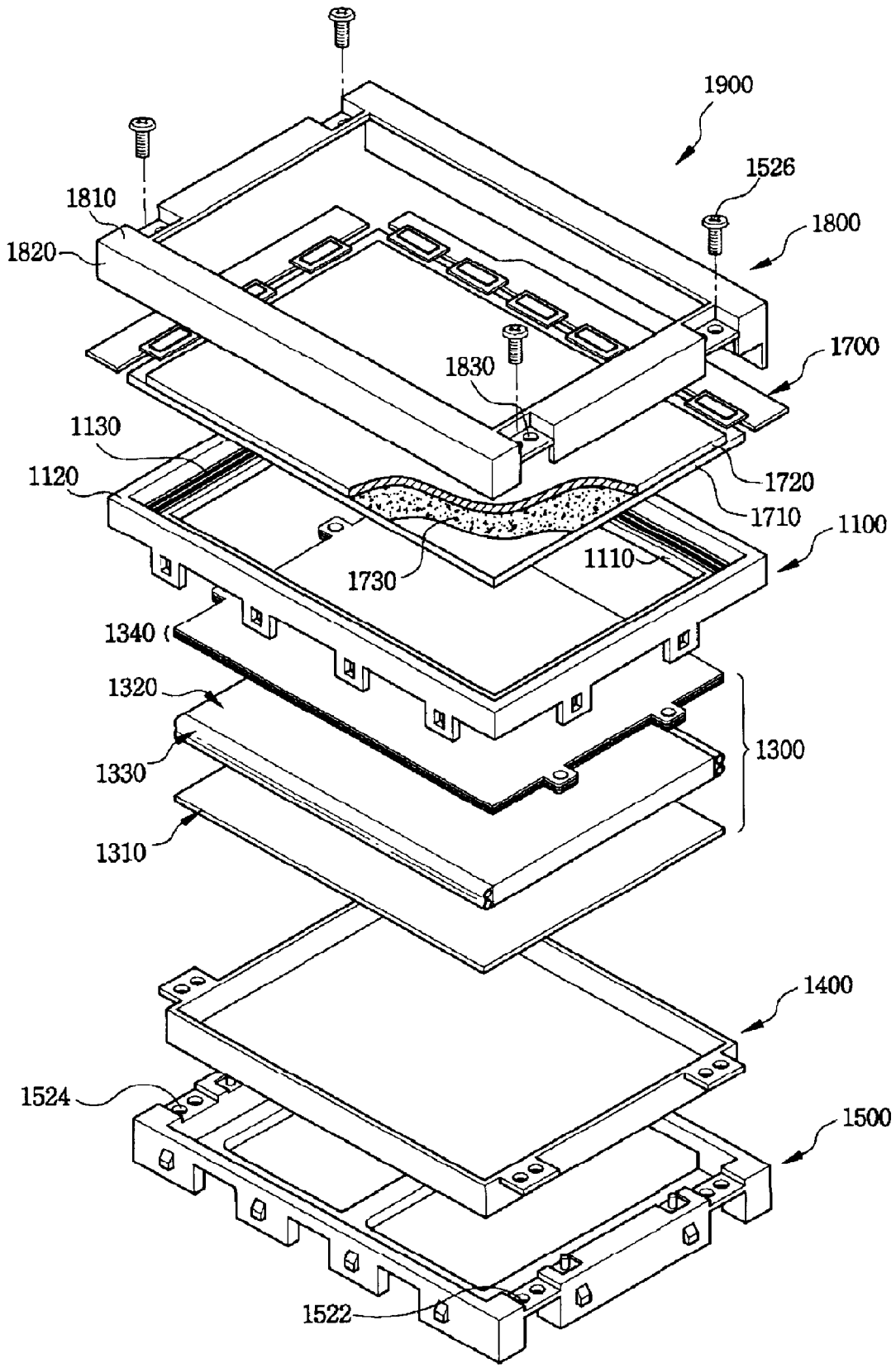
FIG. 13 is an exploded perspective view illustrating a liquid crystal display apparatus according to another embodiment of the present invention.

FIG. 13 is an exploded perspective view illustrating a liquid crystal display apparatus according to another embodiment of the present invention.

Referring to FIG. 13, the liquid crystal display apparatus 1900 includes a first receiving container 1400, a light exiting device 1300, a liquid crystal display panel 1700, a liquid crystal display panel supporting member 1100, a second receiving container 1500 and a chassis 1800.

The first receiving container 1400, the light exiting device 1300 and the liquid crystal display panel supporting member 1100 have been described above with reference to foregoing embodiments, and are therefore not described in further detail here.

The liquid crystal display panel 1700 is disposed in the first supporting member frame portion 1110 of the liquid crystal display panel supporting member 1100. Additionally, the liquid crystal display panel 1700 is fixed by the second supporting member frame portion 1120 of the liquid crystal display panel supporting member 1100.

The liquid crystal display panel 1700 includes a thin film transistor (TFT) substrate 1710, a liquid crystal layer 1730 and a color filter substrate 1720. The TFT substrate 1710 corresponds to the color filter substrate 1720. The liquid crystal layer 1730 is interposed between the thin film transistor substrate 1710 and the color filter substrate 1720.

The chassis 1800 fixes the liquid crystal display panel 1700, and protects the liquid crystal display panel 1700 from an external impact.

The chassis 1800 includes a first chassis face 1810 and a second chassis face 1820 extended from the first chassis face 1810.

The first chassis face 1810 has a shape of rectangular plate to cover the edges of the color filter substrate 1720. The second chassis face 1820 is extended from the first chassis face 1810 in a direction substantially parallel to the fist sidewalls 1420 of the first receiving container 1400. The second chassis 1820 has a shape to cover the first sidewalls 1420 of the first receiving container 1400.

The chassis 1800 has third screw connection holes 1830. The third screw connection holes 1830 are formed in a position corresponding to the second screw connection holes 1522 and 1524 of the second receiving container 1500. The screws 1526 combine the chassis 1800 with the second receiving container 1500 through the first screw connection holes 1425a and 1426a, the second screw connection holes 1522 and 1524 and the third screw connection holes 1830.

Figure 14:
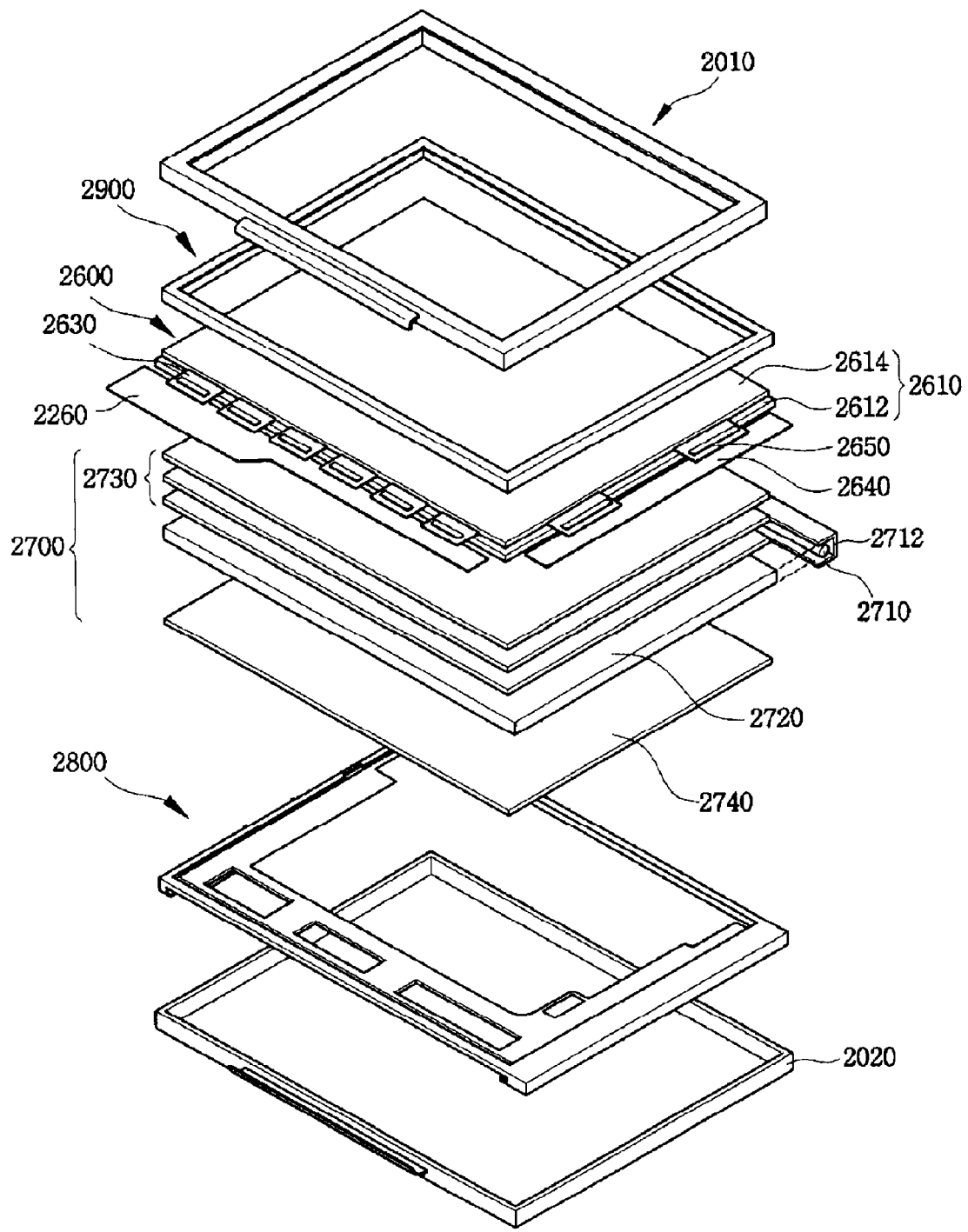
FIG. 14 is an exploded perspective view illustrating a liquid crystal display apparatus according to still another embodiment of the present invention.

FIG. 14 is an exploded perspective view illustrating a liquid crystal display apparatus according to sill another embodiment of the present invention.

Referring to FIG. 14, the liquid crystal display apparatus includes a liquid crystal display module, a front case 2010 and a rear case 2020. The liquid crystal display module displays an image using an image signal, and the front and rear cases 2020 and 2030 receive the liquid crystal display module.

The liquid crystal display module includes a display unit 2600 having a liquid crystal display panel 2610. The display unit 2600 further includes a data printed circuit board 2260, a data tape carrier package 2630, a gate printed circuit board 2640 and a gate tape carrier package 2650.

The liquid crystal display panel 2610 includes a thin film transistor (TFT) substrate 2612, a color filter substrate 2614 and a liquid crystal layer (not shown).

The thin film transistor substrate 2612 corresponds to a glass substrate having thin film transistors formed thereon in a matrix shape. A source electrode of the TFT is electrically connected to a data line, and a gate electrode of the TFT is electrically connected to a gate line. A pixel electrode is formed on the TFT substrate 2612 having TFTs to be connected to the gate electrode. The pixel electrode includes an optically transparent and electrically conductive material such as indium thin oxide (ITO), indium zinc oxide (IZO), etc.

Electrical signals provided to the data line and the gate line are transferred to the source electrode and the gate electrode of the TFT, respectively. The TFT is turned on/off according to the electrical signals. The electrical signals are then transferred to the drain electrode to form a pixel.

The color filter substrate 2614 corresponds to the TFT substrate 2612. The color filter substrate 2614 has RGB pixels formed by a thin film manufacturing process. The RGB pixels correspond to color pixels showing colors as light passes therethrough. A common electrode is formed on the color filter substrate 2612. The common electrode includes an optically transparent and electrically conductive material such as indium thin oxide (ITO), indium zinc oxide (IZO), etc.

When an electric power is supplied to the gate electrode and the source electrode to turn on the TFT, an electric field is generated between the pixel electrode and the common electrode. The electric fields change the arrangement of the liquid crystal interposed between the TFT substrate 2612 and the color filter substrate 2614 so as to give an image.

A drive signal and a timing signal are applied to the gate line and the data line of the TFT to adjust the arrangement and timing for arrangement of the liquid crystal.

As shown in FIG. 14, the data tape carrier package 2630 is attached to a source region of the liquid crystal display panel 2610. The data tape carrier package 2630 is a kind of flexible circuit board that determines the timing to apply the data drive signal. The gate tape carrier package 2650 is attached to a gate region of the liquid crystal display panel 2610 so as to determine the timing to apply the gate drive signal.

The data printed circuit board 2260 and the gate printed circuit board 2640 are electrically connected to the data tape carrier package 2630 and the gate tape carrier package 2650, respectively. Drive signals generated from an external device are applied to the gate line and the data line via the data printed circuit board 2260 and the gate printed circuit board 2640. The data printed circuit board 2260 has a source portion to supply the data drive signal to the liquid crystal display panel 2610 from the image signal generated in an external information processing device (not shown) such as a computer. The gate printed circuit board 2640 has a gate portion to supply the gate drive signal to the liquid crystal display panel 2610 from the image signal generated in an external information processing device such as a computer.

The data printed circuit board 2260 and the gate printed circuit board 2640 generate a gate drive signal, a data signal and a plurality of timing signals. The gate drive signal and the data signal are applied to the liquid crystal display apparatus to operate the apparatus, and the timing signals determine the timing to apply the gate drive signal and the gate signal. The gate drive signal is applied to the gate line of the liquid crystal display panel 2610 through the gate tape carrier package 2650, and the data signal is applied to the data line of the liquid crystal display panel 2610 through the data tape carrier package 2630.

A backlight assembly 2700 is disposed under the display unit 2600 to provide light. The backlight assembly 2700 includes a lamp 2710 that generates light. A lamp cover 2712 protects the lamp 2710.

The light guide plate 2720 is disposed under the liquid crystal display panel 2610. The light guide plate 2720 has a size substantially identical with that of the liquid crystal display panel 2610 of the display unit 2600. The light guide plate 2720 guides the light generated in the lamp 2710 toward the display unit 2600 to convert the light path.

A plurality of optical sheets 2730 are disposed over the light guide plate 2720. The optical sheets 2730 enhance uniformity of the brightness of the light that is exited from the light guide plate 320 and is incident to the liquid crystal display panel 2610. A reflection plate 2740 is disposed under the light guide plate 2720 to reflect the light leaked from the light guide plate 2720 back to the light guide plate 2720.

A mold frame 2800 fixes the display unit 2600 and the backlight assembly 2700. In this embodiment, the mold frame 2800 has a protruding portion.

A top chassis 2900 is provided to combine with the mold frame 2800. The top chassis 2800 fixes the display unit 2600 and the backlight assembly 2700. The top chassis 2900 fixes the data printed circuit board 2260 and the gate printed circuit board 2640 to the bottom plate of the mold frame 2800.

Figure 15:
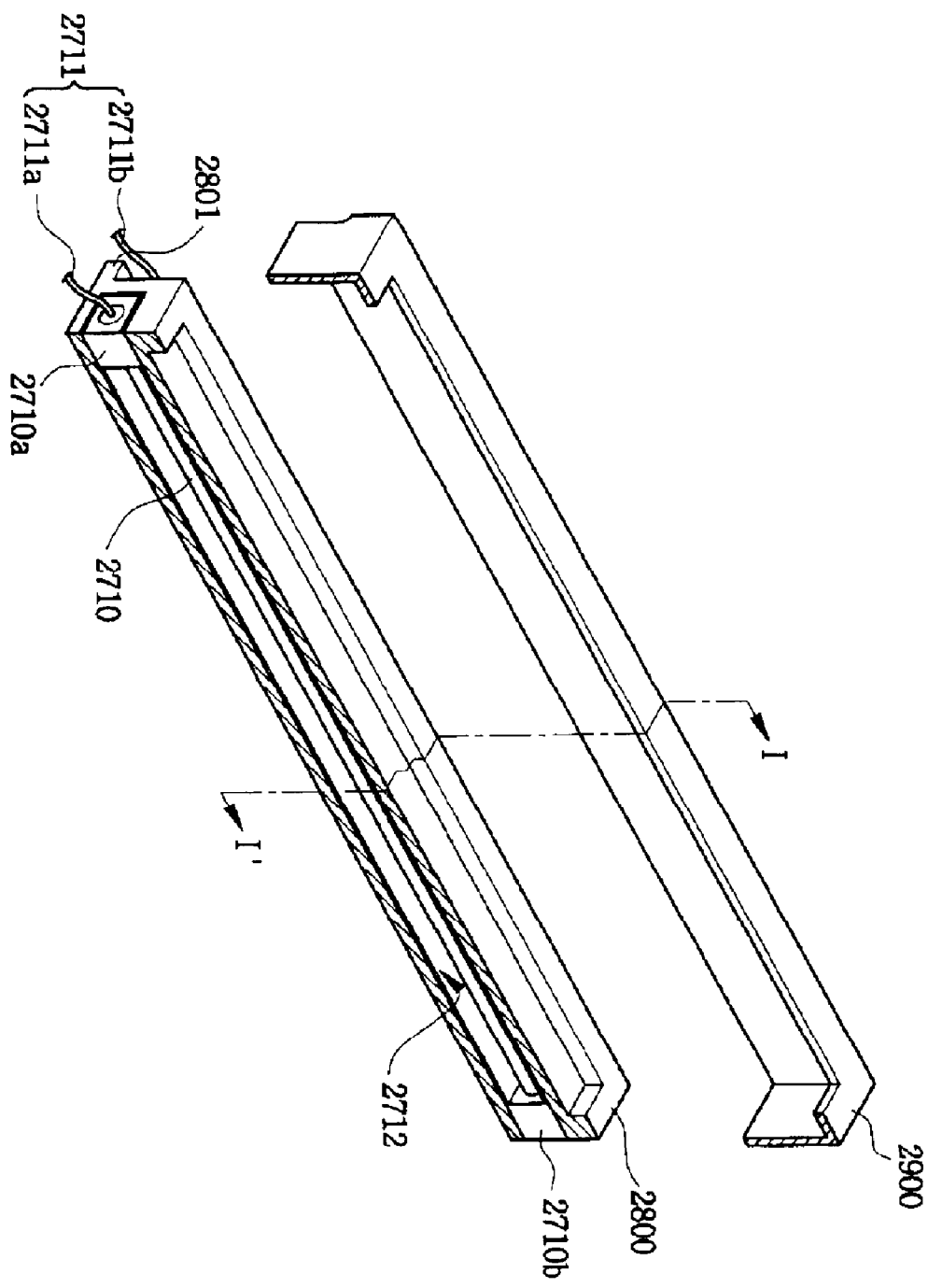
FIG. 15 is an exploded perspective view illustrating a mold frame that receives a lamp unit and a top chassis.
Figure 16:
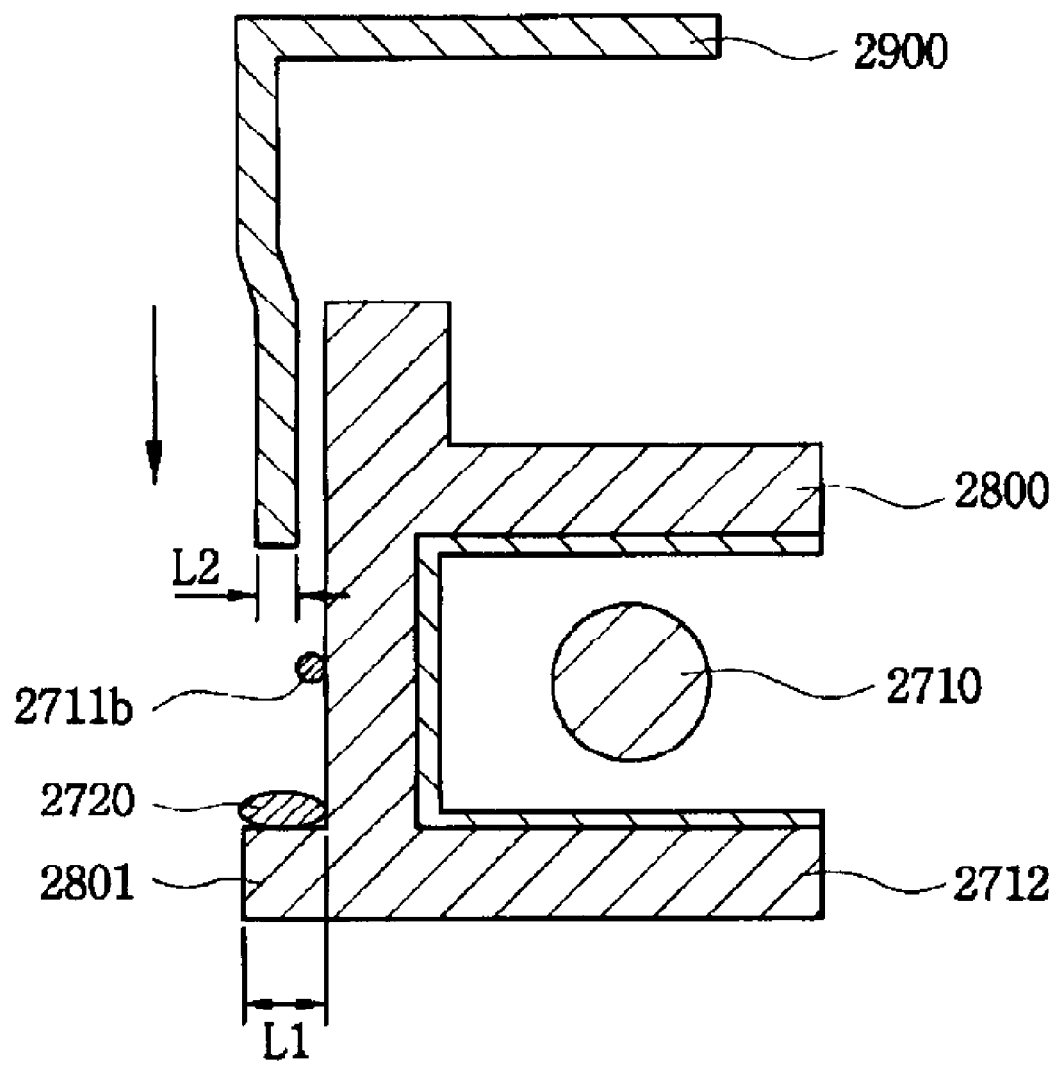
FIG. 16 is a cross-sectional view taken along a line I-I' in FIG. 15.

FIG. 15 is an exploded perspective view illustrating a mold frame that receives a lamp unit and a top chassis. FIG. 16 is a cross-sectional view taken along a line I-I' in FIG. 15.

Referring to FIGS. 15 and 16, the lamp cover 2712 receives the lamp 2710, and the mold frame 2800 receives the lamp cover 2712 at one end portion of the mold frame 2800. Additionally, the mold frame 2800 receives the reflection plate 2740, the light guide plate 2720 and the optical sheets 2730 (see FIG. 13) to provide the light exited from the lamp 2710 to the liquid crystal display panel 2610.

Lamp holders 2710a and 2710b are disposed at both ends of the lamp 2710 to fix the lamp 2710 received in the lamp cover 2712. A hot electrode 2711a and a ground electrode 2711b are respectively connected to both ends of the lamp 2710. A relatively high voltage is applied to the hot electrode 2711a, and a low relatively voltage is applied to the ground electrode 2711b.

The hot electrode 2711a and the ground electrode 2711b are respectively connected to external connectors (not shown) at one end portion of the mold frame 2800. For this, the ground electrode 2711b is extended from one end portion of the lamp 2710 to the other end portion of the lamp 2710 that has the hot electrode 2711a. The hot electrode 2711a is externally extended, and is connected to the connector.

A protruding portion 2801 is formed on the bottom plate of the one end portion of the mold frame 2800. The protruding portion 2810 is laterally extended along the substantially longitudinal direction of the lamp 2710 from the bottom plate of the mold frame 2800. The protruding portion 2801 has a width L1 greater than the thickness L2 of the top chassis 2900. The side face of the mold frame 2800 corresponds to the side face of the top chassis 2900. The side face of the top chassis 2900 is mounted on the protruding portion 2801.

The ground electrode 2711b and the hot electrode 2711a may not be detached from the outer face of the mold frame 2800 because of the protruding portion 2801. Thus, wires covering the ground electrode 2711b and the hot electrode 2711a may not be torn. Even when the ground electrode 2711b and the hot electrode 2711a are detached from the mold frame 2800, the wires may not be torn because the thickness of the top chassis L2 is smaller than the width L1 of the mold frame 2800.

In addition, the protruding portion 2801 forms a space between the mold frame 2800 and the top chassis 2900. Since the space does not face the liquid crystal display panel 2610, particles infiltration may be reduced.

Referring to FIG. 16, an adhesive material 2720 may be coated on the protruding portion 2801 of the mold frame 2800 to effectively prevent particles from infiltrating into the space.

Device for Forming Particle Interceptor

A device for forming a particle interceptor in a first supporting member frame portion of a liquid crystal display panel supporting member of a backlight assembly will be described with reference to accompanied drawings.

Figure 17:
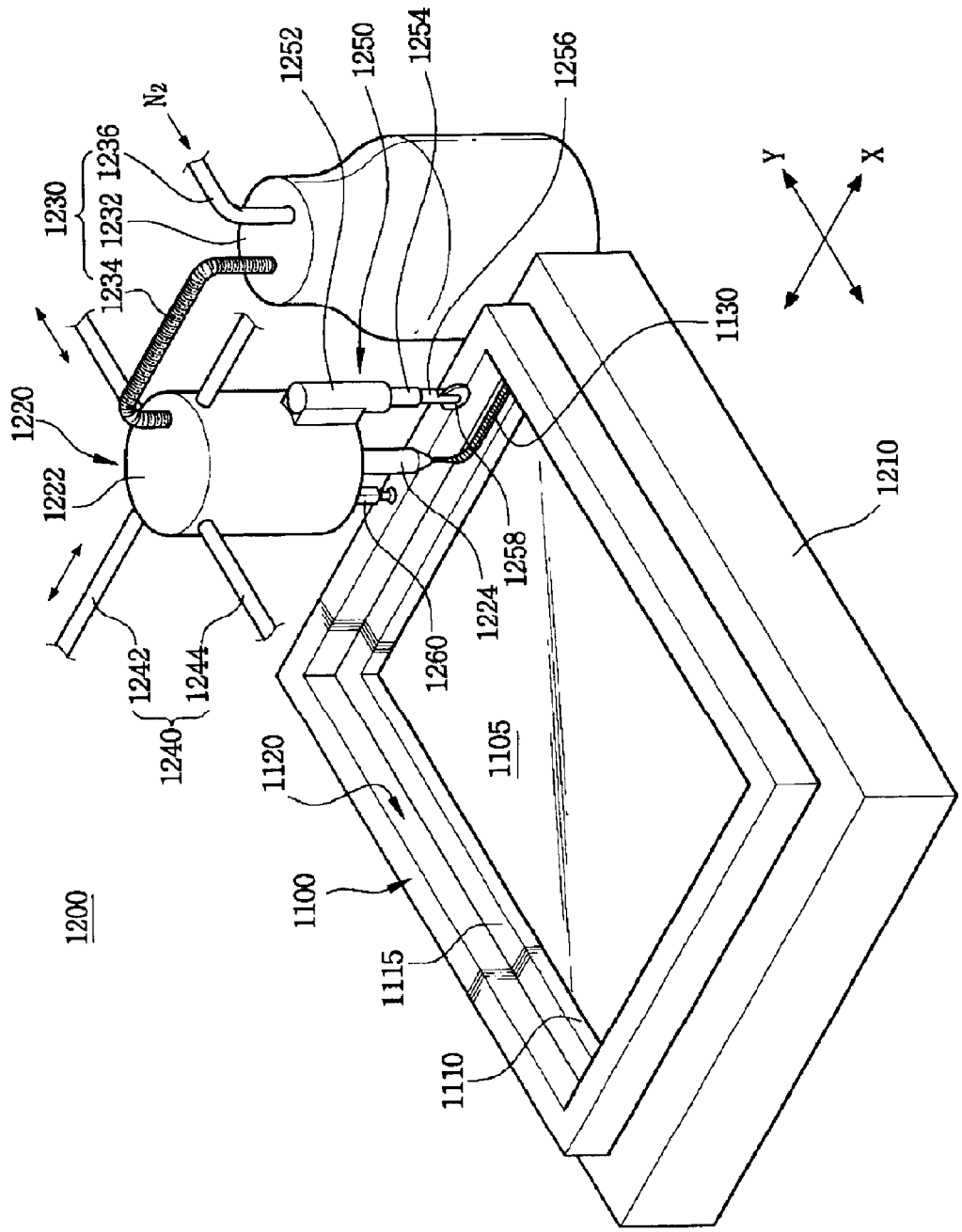
FIG. 17 is a perspective view illustrating a device for forming a particle interceptor for the liquid crystal display apparatus.

FIG. 17 is a perspective view illustrating a device for forming a particle interceptor in a backlight assembly.

Referring to FIG. 17, the particle interceptor 1200 includes a base body 1210, a dispenser 1220, a supply member 1230 and a transporting member 1240.

A liquid crystal display panel supporting member 1100 including a first supporting member frame portion 1110 and a second supporting member frame portion 1120 is installed on the base body 1210.

The dispenser 1220 has a dispenser body 1222 and a nozzle 1224. A material, for example, a silicone material is provided to the dispenser 1220 from the supply member 1230, thereby forming a particle interceptor 1130 on the first supporting member frame portion 1110.

A receiving space (not shown) is formed inside the dispenser body 1222 to receive the silicone material provided from the supply member 1230.

The nozzle 1224 is formed on the bottom plate of the dispenser body 1222. The nozzle 1224 dispenses the silicone material in the receiving space to coat the first supporting member frame 1110 with the silicone material. In this embodiment, the dispenser 1220 has one nozzle 1224. Alternatively, at least two nozzles 1224 may be used.

The supply member 1230 includes a container 1232, a supply duct 1234 and a gas inlet duct 1236.

The container 1232 contains the silicone material that is used to form the particle interceptor 1130.

The container 1232 is connected to the dispenser body 1222 by the supply duct 1234. The silicone material in the container 1232 is supplied to the receiving space. Here, one end of the supply duct 1234 is connected to the container 1232, and the other end of the supply duct 1234 is connected to the dispenser body 1222.

The gas inlet duct 1236 is connected to the container 1232. A nitrogen gas is supplied to the container 1232 through the gas inlet duct 1236, and then the silicone material in the container 1232 is pushed toward the supply duct 1234.

The transporting member 1240 includes a first guide bar 1242 and a second guide bar 1244. The first guide bar 1240 penetrates the dispenser body 1222 along an X-axis, and the second guide bar 1244 penetrates the dispenser body 1222 along a Y-axis. The first guide bar 1242 transports the dispenser 1220 along the X-axis, and the second guide bar 1244 transports the dispenser 1220 along the Y-axis.

The first and second guide bars 1242 and 1244 are connected to a guide rail, and are moved by a driving motor (not shown).

The operation mechanism of the transporting member 1240 is well known in the art, and is therefore not described in further detail here.

The device of forming the particle interceptor in the backlight assembly according to the present invention is suitable for forming the particle interceptor in FIGS. 7 to 10. In case of forming the particle interceptor recess 1138 by compressing the silicone material as shown in FIG. 11, a compression roller 1250 is additionally provided as shown in FIG. 17.

The compression roller 1250 includes a roller body 1252, a rod 1254, a connection portion 1256 and a rotational roller 1258.

The roller body 1252 is installed in the dispenser 1220, and the rod 1254 is connected to the compression roller 1252 facing the liquid crystal display panel supporting member 1100.

The rotational roller 1258 is connected to the rod 1254 by the connection portion 1256.

The silicone material is compressed by the rotational roller 1258 to form the particle interceptor 1136 as shown in FIG. 11.

As shown in FIG. 17, a charge-coupled device (CCD) camera 1260 is used to precisely change the moving direction of the dispenser 1220. Alternatively, a predetermined value may be input to a controlling member (not shown) to change the moving direction of the dispenser 1220 from the X-axis to the Y-axis.

The function of operating the device will be described with reference to FIG. 17.

A liquid crystal display panel supporting member 1100 is disposed under the top face of the base body 1210.

A nitrogen gas is supplied to the gas inlet duct 1236. The nitrogen gas pushes the silicone material in the container 1232 toward the supply duct 1234. The silicone material is then supplied to the receiving space in the dispenser body 1222 through the supply duct 1234.

The silicone material incorporated into the dispenser body 1122 is dispensed toward outside through the nozzle 1224. The transporting member 1240 moves the dispenser 1220 toward a specific direction such as the X-axis.

At least one row of particle interceptor 1130 is formed on the first supporting member frame portion 1110 of the liquid crystal display panel supporting member 1100.

The dispenser 1220 moves along the X-axis to the corner of the first frame portion 1110. The dispenser 1220 then turns to the Y-axis along the second guide bar 1244. The silicone material is continuously coated on the first supporting member frame portion 1110. The above described procedure was repeated to form the particle interceptor 1130 having a closed loop on the first frame portion 1110.

When particle intercepting recess 1138 is formed in the particle interceptor 1130, the rod 1254 of the compression roller 1250 is descended toward the first supporting member frame portion 1110. The rotational roller 1258 moves along the dispenser 1220 to compress the silicone material coated on the first supporting member frame portion 1110, thereby forming the particle intercepting recess 1138.

Having described the exemplary embodiments of the invention and its advantages, it is noted that various changes, substitutions and alterations can be made herein without departing from the spirit and scope of the invention as defined by appended claims.

What is claimed is:

1. A backlight assembly comprising:
a receiving container including a bottom plate and sidewalls protruded from edges of the bottom plate to form a receiving space;
a light exiting device disposed in the receiving space; and
a liquid crystal display panel supporting member including a first supporting member frame portion, a second supporting member frame portion, a first particle interceptor and a second particle interceptor, the first supporting member frame portion having an opening, an opening face formed in an internal face of the first supporting member frame portion to define the opening, and a connection groove carved from the opening face, the second supporting member frame portion being vertically extended from the first supporting member frame portion, the side face of the liquid crystal display panel that is to be mounted on the liquid crystal display panel supporting member facing the inner side face of the second supporting member frame portion, the second supporting member frame portion fixing the liquid crystal display panel, the first particle interceptor being formed along the top face of the first supporting member frame portion facing the bottom plate of the liquid crystal display panel, the first particle interceptor having at least two cut portions near the connection groove, the second particle interceptor being disposed between the cut portions to prevent particles from infiltrating into the first particle interceptor.

2. The backlight assembly of claim 1, wherein the second particle interceptor includes a first body sticking to the side face of the first particle interceptor, a second body extended from the first body and interposed between the cut portions, and a third body connected to the second body and being substantially parallel to the first body.

3. The backlight assembly of claim 2, wherein the second particle interceptor has an H-shape.

4. The backlight assembly of claim 1, wherein the second particle interceptor includes a first body sticking to the side face of the first particle interceptor, and a second body extended from the first body and interposed between the cut portions.

5. The backlight assembly of claim 4, wherein the second particle interceptor has T-shape.

6. The backlight assembly of claim 1, wherein the second particle interceptor having a shape of band sticks to the side face of the first particle interceptor.

7. The backlight assembly of claim 1, wherein the second particle interceptor comprises polyethylenterephthalate (PET), and an adhesive material is coated on a surface of the second particle interceptor.

8. The backlight assembly of claim 1, wherein the connection groove combines with a protruded fixing portion of optical sheets.

9. A liquid crystal display apparatus comprising:
- a receiving container including a bottom plate and sidewalls, the sidewalls protruded from edges of the bottom plate to form a receiving space;
- a light exiting device disposed in the receiving space;
- a liquid crystal display panel supporting member including a first supporting member frame portion, a second supporting member frame portion, a first particle interceptor and a second particle interceptor, the first supporting member frame portion having an opening, an opening face formed in an internal face of the first supporting member frame portion to define the opening, and a connection groove carved from the opening face, the second supporting member frame portion being vertically extended from the first supporting member frame portion, the side face of the liquid crystal display panel that is to be mounted on the liquid crystal display panel supporting member facing the inner side face of the second supporting member frame portion, the second supporting member frame portion fixing the liquid crystal display panel, the first particle interceptor being formed along the top face of the first supporting member frame portion facing the bottom plate of the liquid crystal display panel, the first particle interceptor having at least two cut portions near the connection groove, the second particle interceptor being disposed between the cut portions to prevent particles from infiltrating into the first particle interceptor;
- a liquid crystal display panel assembly mounted on the first supporting member frame portion, the liquid crystal display panel assembly being fixed by the second supporting member frame portion; and
- a chassis that fixes the liquid crystal display panel assembly.

* * * * *